(12) United States Patent
Hiraki et al.

(10) Patent No.: US 6,334,496 B1
(45) Date of Patent: Jan. 1, 2002

(54) CRAWLER DEVICE FOR A CRAWLER TYPE VEHICLE

(75) Inventors: Hikosaburo Hiraki, Oyama; Haruhiro Tsubota, Fujisawa; Kazutoshi Hori, Katano, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/171,071

(22) PCT Filed: Apr. 8, 1997

(86) PCT No.: PCT/JP97/01200

§ 371 Date: Oct. 9, 1998

§ 102(e) Date: Oct. 9, 1998

(87) PCT Pub. No.: WO97/37885

PCT Pub. Date: Oct. 16, 1997

(30) Foreign Application Priority Data

Apr. 10, 1996 (JP) .............................. 8-113219
Dec. 26, 1996 (JP) .............................. 8-359204

(51) Int. Cl.[7] .............................................. B62D 55/14
(52) U.S. Cl. ........................................ 180/9.5; 305/124
(58) Field of Search .................................. 180/9.5, 9.52; 305/124, 130, 135, 139, 129; 280/5.22

(56) References Cited

U.S. PATENT DOCUMENTS

| | | | | |
|---|---|---|---|---|
| 3,863,727 A | * | 2/1975 | Michrina | 180/9.1 |
| 5,265,692 A | * | 11/1993 | Mallette | 180/193 |
| 5,273,126 A | * | 12/1993 | Reed et al. | 180/9.21 |
| 5,316,381 A | * | 5/1994 | Isaacson et al. | 305/10 |
| 5,452,949 A | * | 9/1995 | Kelderman | 305/24 |
| 5,577,567 A | * | 11/1996 | Johnson et al. | 180/9.23 |
| RE36,284 E | * | 8/1999 | Kelderman | 305/129 |

FOREIGN PATENT DOCUMENTS

| | | |
|---|---|---|
| JP | 3-79421 | 4/1991 |
| JP | 4-8682 | 1/1992 |
| JP | 6-144306 | 5/1994 |

* cited by examiner

*Primary Examiner*—Robert P. Olszewski
*Assistant Examiner*—Michael Cuff
(74) *Attorney, Agent, or Firm*—Sidley Austin Brown & Wood

(57) ABSTRACT

The present invention is a crawler device for a crawler type vehicle, which lowers the vehicle height, decreases the vehicle width, and exhibits superior stability during operation. For this purpose, in a crawler type vehicle having, on right and left sides of either one of front or rear portion, or both of the front and rear portions of a vehicle body (3), crawler devices each having a sprocket (12), an idler (16A) disposed on a truck frame (15), and a crawler belt (11) passed around the sprocket (12) and the idler (16A), the crawler device includes a front end link (181) coupled to a forward part of said truck frame (15) by means of a pin (181D) at a lower end portion thereof and to the side of said vehicle body (3) by means of a pin (181U) at the upper end portion thereof, and a rear end link (182) coupled to a rearward part of said truck frame (15) by means of a pin (182D) at the lower end portion thereof and to said side of said vehicle body (3) at a position behind said front end link (181) by means of a pin (182U) at the upper end portion thereof.

15 Claims, 25 Drawing Sheets

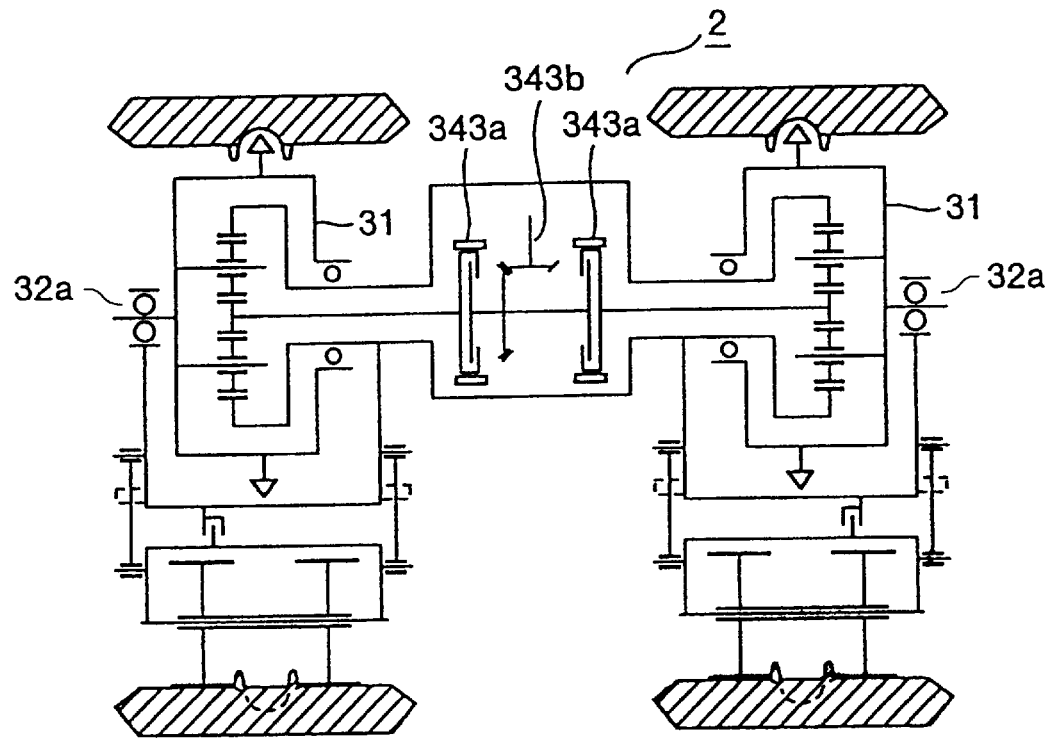
F I G. 34
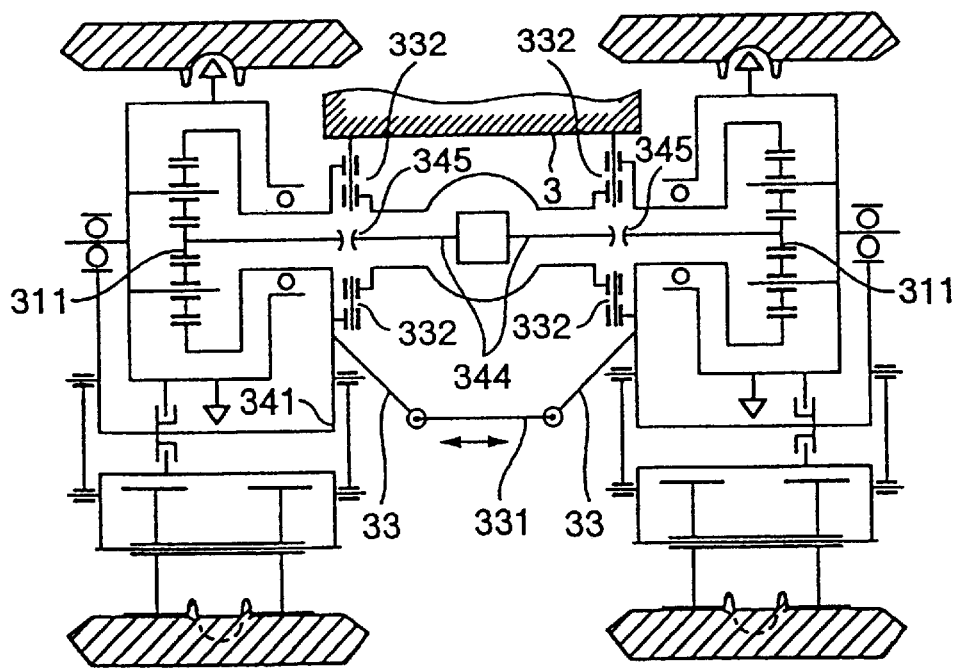
F I G. 35

CRAWLER DEVICE FOR A CRAWLER TYPE VEHICLE

TECHNICAL FIELD

The present invention relates to a crawler device provided in a crawler type of construction vehicle, a vehicle for traveling on an irregular ground, or the like.

BACKGROUND ART

FIG. 45 is a side view of a construction vehicle 2 having a crawler device in a triangular form. An upper revolving superstructure 4 is mounted on a vehicle body 3 of the vehicle 2, and a working machine 5, having a bucket or the like, is attached on the upper revolving superstructure 4. The crawler devices 1 of triangular form, being traveling devices, are respectively provided at the front and the rear, and at the right and the left portions of the vehicle body 3. Specifically, a pair of right and left crawler devices 1A and 1A, coupled to a steering device and a driving steering device and a driving device, are disposed at the front part of the vehicle body 3; and a pair of right and left crawler devices 1B and 1B, coupled to the driving device, are disposed at the rear part of the vehicle body 3. In order to make the explanation understandable, the crawler devices 1A are taken as a pair of right and left crawler devices coupled to the steering device and the driving device, and the crawler devices 1B are taken as a pair of right and left crawler devices coupled to the driving device. Further, the crawler devices 1A and/or the crawler devices 1B are collectively called the crawler device 1.

The details of the crawler device 1 having a triangular form are disclosed in, for example, Japanese Laid-open Patent No. 4-8682. This will be explained with reference to FIG. 46. FIG. 46 is a sectional view of the rear end crawler device 1B taken along the A—A line in FIG. 45.

A sprocket 12, rotationally driving a crawler belt 11, is fixedly provided on the external perimeter of the outside end portion of a wheel hub 31, which is on a side of the vehicle body 3 and is free to rotate. A bracket 13 is rotatably attached to the wheel hub 31 via a bearing 32. A truck frame 15, equipped with a roller 14, is fixedly provided at the lower portion of the bracket 13. The front end crawler device 1A has the same configuration as above, and both of the crawler devices 1A and 1B are free to swing about the respective sprocket 12. Each of the crawler devices 1 is supported on the vehicle body 3 by means of a suspension mechanism (not illustrated). Specifically, in the vehicle 2, each crawler device 1 not only is in four-point contact with a road surface, but also can be evenly in contact with even an irregular ground surface with the aforesaid swing function of the crawler device 1.

The truck frame 15 of the aforesaid crawler device 1 in a triangular form has a recoil spring 17 at almost the center portion between a front end idler 16A and a rear end idler 16B as shown in a schematic diagram in FIG. 47. When the front end idler 16A receives a large impactive force from the front, the recoil spring 17 contracts and the front end idler 16A moves to the position shown by an alternate long and two short dashes line to thereby absorb the impactive force.

However, the aforesaid conventional crawler device 1 has the following disadvantages.

(1) The vehicle body 3 is supported by the truck frame 15 by means of the bearing 32, which is placed nearer to the side of the vehicle body 3 than to the sprocket 12. However, the bearing 32 is fitted onto the wheel hub 31. Specifically, the bearing 32 is not provided on an axle beam (not illustrated) and the vehicle body 3 itself, and dose not support the vehicle body 3. The wheel hub 31 is a rotary body for transmitting a rotational force to the sprocket 12. Accordingly, unless the wheel hub 31 is constructed to have higher strength, there is a disadvantage in that the vehicle body 3 is difficult to be supported while smoothly transmitting the rotational force to the sprocket 12. It is extremely disadvantageous for a working vehicle with heavy weight like the machines cited as an example. When the wheel hub 31 is highly strengthened, the wheel hub 31 is inevitably increased in size. Specifically, there is a disadvantage in that the vehicle height is difficult to be lowered.

(2) The wheel hub 31 is placed nearer to the vehicle body 3 than to the sprocket 12. Therefore in a large-sized vehicle which contains a reduction gear such as a planetary gear train or the like, the configuration of the small space between the right and left sprockets 12 and 12 is complicated. Accordingly, there are disadvantages in that the vehicle height is difficult to be lowered, in that the distance between the sprockets 12 and 12 is difficult to be shortened (specifically, the vehicle width is difficult to be reduced), and in that the maintainability of the wheel hub 31 is worsened.

(3) The crawler device 1 is free to swing about the sprocket 12. For this reason, as shown in FIG. 48, there is a disadvantage in that the front part of the front end crawler device 1A faces downwardly (specifically, stumbles) when the vehicle 2 collides with an obstacle 6 in the front. The crawler device 1 is always free to swing; therefore, there is a disadvantage in that when an operation is carried out with the working machine 5, the crawler device 1 swings, depending on the variations in the load on the working machine 5, and on road conditions; and an operation to be carried out while standing firm cannot be carried out. Specifically, there is a disadvantage of unsatisfactory stability during operation.

SUMMARY OF THE INVENTION

The present invention is made to eliminate the aforesaid disadvantages of the prior art, and its object is to provide a crawler device for a crawler type vehicle with a simple structure, which lowers the vehicle height, decreases the vehicle width, has excellent maintainability, does not stumble even when colliding with an obstacle during traveling, and provides superior operation stability in a working vehicle.

A first configuration of a crawler device for a crawler type vehicle according to the present invention is, in a crawler type vehicle including, on the right and the left sides of either one of a front or a rear portion or both of the front and the rear portions of a vehicle body, crawler devices, each having a sprocket being a driving wheel, an idler being a driven wheel disposed on a truck frame, and a crawler belt passed around the sprocket and the idler, characterized by including a front end link, coupled to a forward part of the truck frame by means of a pin at a lower end portion thereof and to the vehicle body side by means of a pin at the upper end portion thereof, and a rear end link, coupled to a rearward part of the truck frame by means of a pin at the lower end portion thereof and to the vehicle body side at a position behind the front end link by means of a pin at the upper end portion thereof.

According to the first configuration, when an external force in a fore-and-aft direction is exerted on the truck frame, the truck frame can swing in the fore-and-aft directions, supported by the front link and the rear link.

Accordingly, when the idler collides with an obstacle during traveling, the truck frame swings rearwardly and absorbs the impact. For this reason, the conventional recoil spring becomes unnecessary, thereby simplifying the configuration.

A second configuration is, in the aforesaid first configuration, characterized by the sprocket being disposed on either one of the front or the rear portion of the truck frame, and the idler being disposed on the other one of the front or the rear portion of the truck frame. According to the second configuration, in addition to the operational effects in the first configuration, a so-called low drive configuration is established. Specifically, the vehicle height can be lowered, and the position of the center of gravity is lowered, thereby improving the stability.

A third configuration is, in a crawler type vehicle including, on the right and left sides of either one of a front or a rear portion or both of the front and the rear portions of a vehicle body, crawler devices each having a sprocket being a driving wheel, a front end idler and a rear end idler being driven wheels respectively disposed at the front and the rear positions of a truck frame disposed under the sprocket, and a crawler belt passed around the sprocket, the front end idler, and the rear end idler, characterized by including:

a front end link, coupled to a forward part of the truck frame by means of a pin at a lower end portion thereof and to the vehicle body side by means of a pin at the upper end portion thereof, and a rear end link, coupled to a rearward part of the truck frame by means of a pin at the lower end portion thereof and to the vehicle body side at a position behind the front end link by means of a pin at the upper end portion thereof.

In the aforesaid third configuration, the crawler device is specified to be in a triangular form compared to the aforesaid first configuration. Consequently, according to the third configuration, the same operational effects as in the first configuration are obtained.

A fourth configuration is, in the aforesaid first or the third configuration, characterized by a quadric link structure, which is formed by the vehicle body, the truck frame, the front end link, and the rear end link, having a side length on the truck frame side shorter than a side length on the vehicle body side. According to the fourth configuration, when the idler, or one of the front end idler and the rear end idler collides with an obstacle while the vehicle is traveling, the truck frame swings in such a way that the front portion of the truck frame moves upwardly, and the rear portion of the truck frame moves downwardly. Accordingly, the device can pass over the obstacle without stumbling thereon. Specifically, traveling performance on an irregular ground is improved.

A fifth configuration is, in the aforesaid fourth configuration, characterized by a point of intersection of an axis of the front end link and an axis of the rear end link being located inside the loop of the endless crawler belt. According to the fifth configuration, the point of intersection is located inside the loop of the crawler belt; therefore, the swing of the crawler device is increased.

A sixth configuration is, in the aforesaid first or third configuration, characterized by either one or both of the front end link and/or the rear end link being of an extension type comprising of a turn buckle type, a grease cylinder type, or the like. According to the sixth configuration, the link is extended in a normal situation, and is contracted at the time of attaching and detaching the crawler belt, thereby facilitating the operation of attaching and detaching the crawler belt.

A seventh configuration is, in the aforesaid first or third configuration, characterized by upper rollers, which are allowed to rotate in contact with the inner side surface of the upper part of the endless crawler belt, being respectively provided at two positions on the vehicle body side corresponding to positions at the forward and rearward parts of the truck frame. Conventionally, when the crawler device collides with an obstacle and the crawler device swings, the crawler belt is slightly loosened. However, according to the seventh configuration, even if the crawler device swings, the upper rollers lift the crawler belt from the inside thereof; therefore, the crawler belt is not loosened. Specifically, the crawler belt is tightened. Accordingly, stability can be maintained during traveling.

An eighth configuration is, in the aforesaid first or third configuration, characterized by further including an arm which is provided at the position on the vehicle body side corresponding to a position which is above the crawler belt and on a vertical line passing through almost the center of a distance from the upper end portion of the front end link to the upper end portion of the rear end link, with the center of the arm being free to swing in a vertical direction and the length thereof being in a fore-and-aft direction, and rollers respectively provided on the front end portion and the rear end portion of the arm, with the rollers being provided to be pressed against the crawler belt downwardly from the upper surface of the crawler belt. According to the eighth configuration, even if the crawler device swings, either of two rollers presses the crawler belt downwardly from the outside; therefore, the crawler belt is not loosened. Specifically, the crawler belt is tightened. Consequently, stability can be maintained during traveling. Especially in the eighth configuration, the crawler belt is always pressed toward the sprocket side; therefore, skipping pitch and separation of the crawler belt on the sprocket is prevented, and the traveling performance is improved.

A ninth configuration is, in the aforesaid first or third configuration, characterized by either one of the front end link, coupling with the pins at the upper and the lower end portions of the front end link, or the rear end link, coupling with the pins at the upper and the lower end portions of the rear end link, being an elastic member fixedly provided at either one or both of the vehicle body side and/or the truck frame. According to the ninth configuration, one side is supported by the elastic member while the other side is coupled by the link; therefore, even if the front end idler collides with an obstacle during traveling, the truck frame swings rearwardly, and the rear end idler moves downwardly, thereby establishing the position to pass over the obstacle, and the traveling performance on an irregular ground is improved. Even if the device collides with the obstacle, the elastic member absorbs the impactive force.

A tenth configuration is, in a crawler type vehicle including, on right and left sides of either one of a front or a rear portion or both of the front and the rear portions of a vehicle body, crawler devices each having: a sprocket, being a driving wheel, which is supported by means of a bearing provided at the vehicle body side; a front end idler and a rear end idler, being driven wheels respectively disposed at the front and the rear positions of a truck frame disposed under the sprocket; and a crawler belt passed around the sprocket, the front end idler, and the rear end idler; characterized by including an extendedly provided member which is provided to extend from the vehicle body side over the sprocket to the outside thereof, with the bearing being provided at the extendedly provided member.

According to the tenth configuration, a wheel hub with a complicated structure or the like can be disposed on the outside of the vehicle, and the sprocket can be supported at both ends. Accordingly, the small space between the sprockets can be simplified. Specifically, the vehicle height can be lowered, and the vehicle width can be decreased. Consequently, entry into a narrow path is facilitated and the transportability is improved. If the wheel hub with a complicated structure is provided outside, maintainability is improved.

An eleventh configuration is, in the aforesaid tenth configuration, characterized by further including a front end link, coupled to a forward part of the truck frame by means of a pin at a lower end portion thereof and to the vehicle body side by means of a pin at the upper end portion thereof, and a rear end link, coupled to a position at a rearward part of the truck frame by means of a pin at the lower end portion thereof and to the vehicle body side at a position behind the front end link by means of a pin at the upper end portion thereof. The feature of the aforesaid eleventh configuration corresponds to the feature of the aforesaid first configuration. Consequently, according to the eleventh configuration, the same operational effects as provided by the first configuration are obtained.

A twelfth configuration is, in the aforesaid second configuration, characterized by the truck frame having at least one roller at the lower portion thereof between the idler and the sprocket, the crawler belt having tread surfaces in a protrusion form at a predetermined pitch spaced with a predetermined gap, to be trod by the idler, the sprocket, and the roller; and a space between the idler and a roller adjacent to the idler, a space between the sprocket and a roller adjacent to the sprocket, and a space between the idler and the sprocket being respectively expressed by $$[(0.5\pm0.2)+N]\times Lp$$

if N is set as zero or a natural number, and Lp is set as a crawler belt pitch.

Further, a thirteenth configuration is, in the aforesaid third or tenth configuration, characterized by the truck frame having at least one roller at the lower portion thereof between the front end idler and the rear end idler, the crawler belt having tread surfaces in a protrusion form at a predetermined pitch spaced with a predetermined gap to be trod by the front end idler, the rear end idler, and the roller; and a space between the front end idler and a roller adjacent to the front end idler, a space between the rear end idler and a roller adjacent to the rear end idler, and a space between the front end idler and the rear end idler being respectively expressed by $$[(0.5\pm0.2)+N]\times Lp$$

if N is set as zero or a natural number, and Lp is set as a crawler belt pitch.

According to the twelfth and the thirteenth configurations, even when any one of the idlers (or the front side idler and the rear side idler), the sprocket, and the rollers are positioned on the predetermined gap of the crawler belt and is to fall in the predetermined gap, all of the others ride on the tread surface. Accordingly, the occurrence of greater pitching of the crawler device, based on the aforesaid predetermined gap, can be prevented. Specifically, the vibration during traveling is decreased; therefore, riding comfort is improved.

A fourteenth configuration is, in any one of the aforesaid first, third, and tenth configurations, characterized by either or both of a swing stopping mechanism, for stopping the swing of the truck frame at any position, and/or a swing control mechanism, for controlling the maximum swing of the truck frame, being provided between the vehicle body side and the truck frame. According to the fourteenth configuration, the swing of the crawler device can be stopped at any position by using the swing stopping mechanism. If the swing control mechanism is used, the unlimited swing of the crawler device is eliminated. Specifically, if the vehicle body is, for example, a construction machine or the like equipped with an excavator or the like, and when the operation is carried out, the vehicle is stopped, and in this situation, the swing stopping mechanism is applied. Thus the crawler device maintains an angle of swing at the time of stopping the vehicle irrespective of variations in the load or the road conditions. Consequently, standing firm operations can be carried out. Specifically, stability is secured in carrying out an operation.

A fifteenth configuration is, in any one of the aforesaid first, third, and tenth configurations, characterized by the endless crawler belt being made of rubber and having a plurality of raised portions at predetermined pitches on the inner center portion thereof in a direction to be passed around, the sprocket having a plurality of engaging gears with the raised portions on the outer perimeter and having cylinder members, which are fixedly provided on the right and the left sides of the engaging gears and allow the outer perimeter surface thereof to abut the surface surrounding the raised portions, and an external diameter of the sprocket being smaller than an external diameter of the top of the engaging gear.

According to the fifteenth configuration, when the raised portions of the crawler belt are meshed with the engaging gears of the sprocket, the engaging gears are engaged in the bottom surface and the side surface of respective raised portions by "(the external diameter of the top of the engaging gear–the external diameter of the sprocket)/2". At the same time, the external perimeter surfaces of the cylinder members forcefully contact the surface surrounding the raised portions of the crawler belt. Accordingly, the crawler belt obtains a rotational driving force from the sprocket. Accordingly, a light weight crawler belt, without core metals or the like, can be used for the crawler belt. Consequently, the sprocket can transmit a highly efficient rotational force to the crawler belt. Specifically, higher tractive force can be obtained; the crawler belt is difficult to fall off by the engaging amount δ; skids are difficult to occur; and the size, the noise, and the cost can be reduced.

BRIEF DESCRIPTION OF THE DRAWINGS

FIG. 29A is an explanatory view of the situation where the stoppers are separated;

FIG. 29B is an explanatory view of the situation wherein the stoppers start to be in contact with each other;

FIG. 29C is an explanatory view of the situation in that the stoppers has completed the contact;

FIG. 34 is an explanatory diagram of another example of the power train in FIG. 32;

FIG. 35 is an explanatory diagram of another example of the power train in FIG. 32;

BEST MODE FOR CARRYING OUT THE INVENTION

Figure 1:
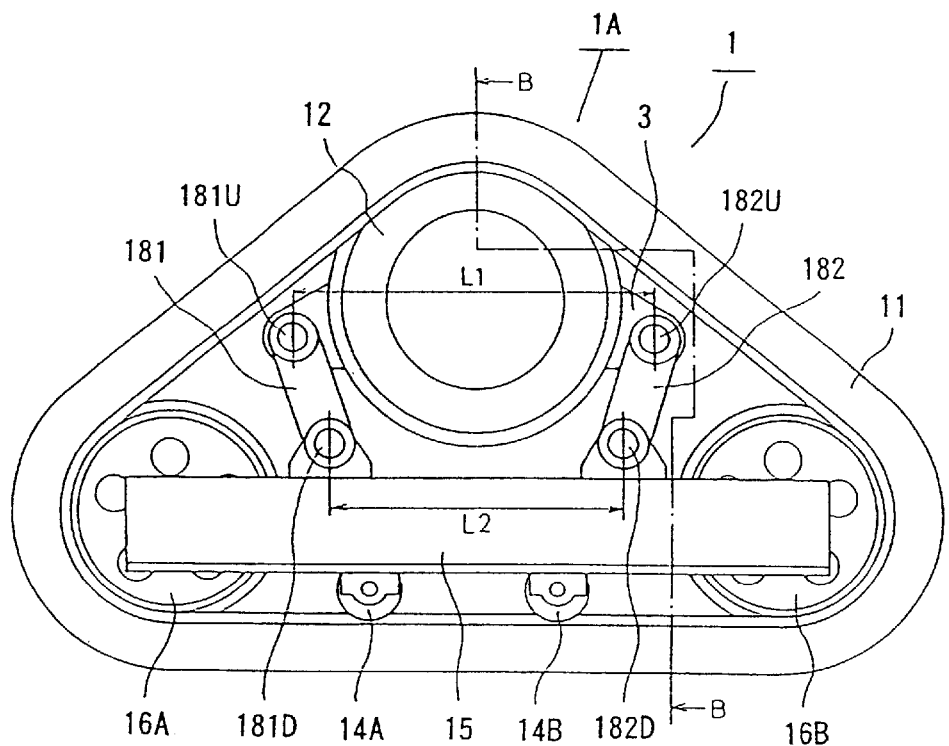
FIG. 1 is a side elevational view of a crawler device in a triangular form in a first embodiment according to the present invention.

A first embodiment will be explained with reference to FIGS. 1–4. The first embodiment is a crawler device 1 in a triangular form as shown in FIG. 1. A sprocket 12 is attached to a vehicle body 3. The vehicle body 3 is coupled to a front portion of a truck frame 15 via a front end link 181 by means of coupling pins 181U and 181D, and the vehicle body 3 is coupled to a rear portion of the truck frame 15 via a rear end link 182 by means of coupling pins 182U and 182D. Specifically, the vehicle body 3, the truck frame 15, the front end link 181, and the rear end link 182 constitute a quadric link. A distance L2 between the coupling pins 181D and 182D is designed to be shorter than a distance L1 between the coupling pins 181U and 182U (L2<L1). An idler 16A is attached to the front end of the truck frame 15, an idler 16B is attached to the rear end of the truck frame 15, and two rollers 14A and 14B are attached to the lower surface of the truck frame 15.

Figure 2:
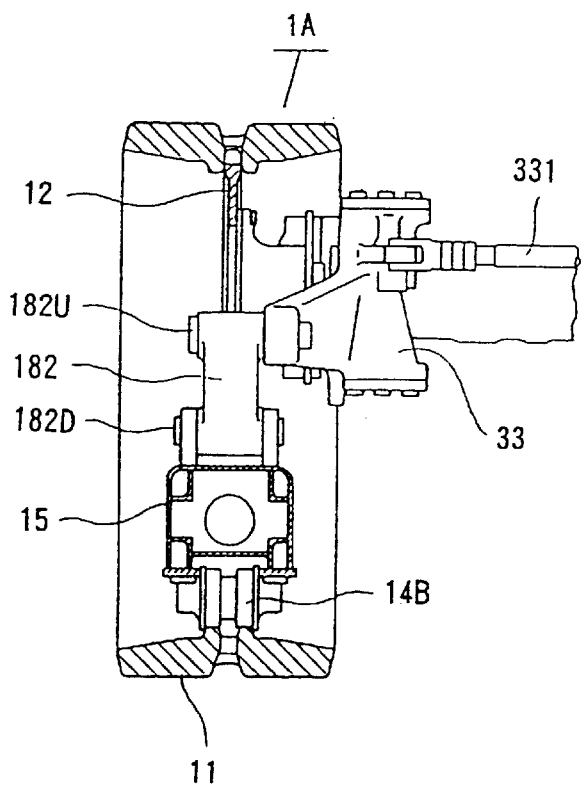
FIG. 2 is a sectional view taken along the B—B line in FIG. 1.

A crawler belt 11 is passed around the sprocket 12, the front end idler 16A, the rear end idler 16B, the front end roller 14A, and the rear end roller 14B. As FIG. 2 illustrates, a steering knuckle arm 33 is connected to the coupling pin 182U.

The steering knuckle arm 33 is supported (not illustrated) by the vehicle body 3, and is provided with a steering tie rod 331 so as to extend therefrom. The sprocket 12 is freely rotated, receiving a driving force from the side of the vehicle body 3, which is transmitted from a propeller shaft (not illustrated) and a universal joint (not illustrated), which are contained in an axle beam 34 (see FIG. 6), in that order. Specifically, the first embodiment is a front end crawler device 1A which is coupled to a steering device and a driving device. The operational effects of the aforesaid first embodiment are as follows.

Figure 3:
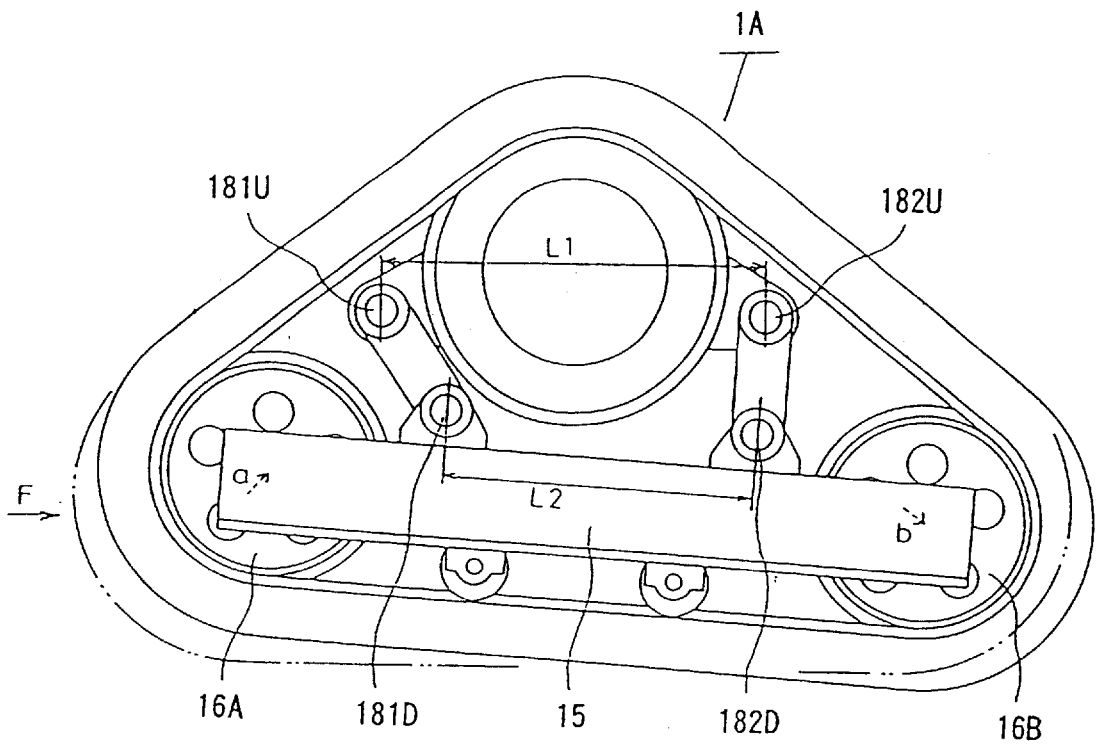
FIG. 3 is an explanatory view of the operation of the crawler device of FIG. 1.
Figure 4:
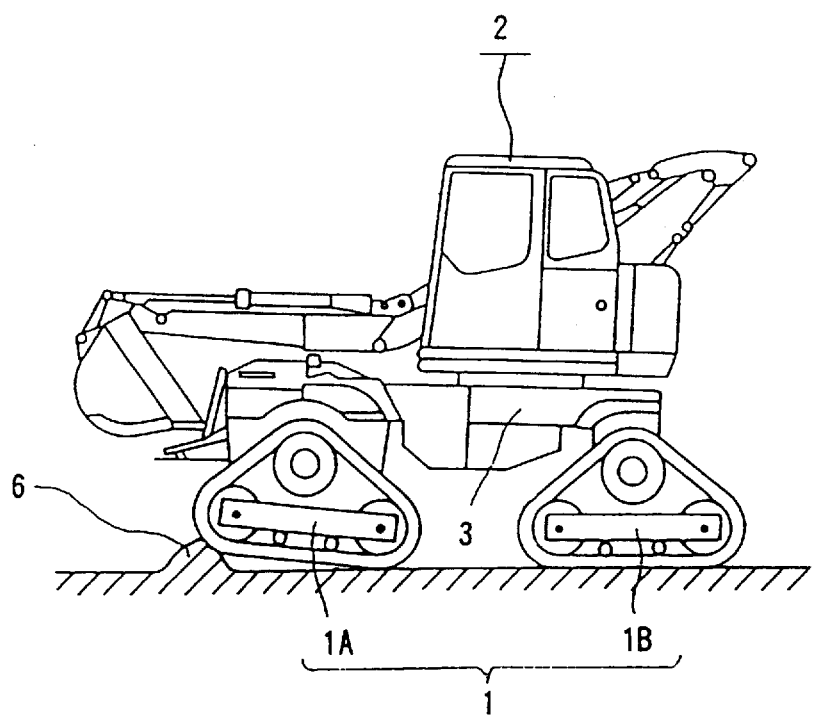
FIG. 4 is a side elevational view of a vehicle equipped with crawler devices of FIG. 1.

As FIG. 3 illustrates, when a force is exerted on the front end idler 16A from the front as shown by an arrow F, in the truck frame 15, the front end idler 16A moves to the rear and upwardly as shown by a broken line arrow a, while the rear end idler 16B moves to the rear and downwardly as shown by a broken line arrow b according to the aforesaid relationship "L2<L1" of the quadric link. Accordingly, as shown in FIG. 4, the front end crawler device 1A is in a position to pass over an obstacle 6 in front, and does not stumble as in the prior art. When the crawler device 1 collides against the obstacle 6, the impactive force is absorbed by the rearward movement of the truck frame 15 based on the deformation of the quadric link. This eliminates the need for the recoil spring 17 of the prior art. Specifically, the configuration is simplified. The vehicle body 3 is supported by means of the knuckle arm 33 with a simple structure, thereby eliminating the need for the bearing 32 of the prior art. Specifically, a rotational force is transmitted to the sprocket 12 without laboring, and the configuration between the sprockets 12 and 12 can be simplified; therefore, the vehicle height is lowered, the vehicle width is decreased, and the maintainability is improved.

In the first embodiment, the front end crawler device 1A is supported by a front end link 181 and a rear end link 182, but it is suitable that only the rear end crawler device 1B is supported by a front end link 181 and a rear end link 182, or it is suitable that both of the crawler devices 1A and 1B are supported by a respective front end link 181 and a respective rear end link 182.

A second embodiment is explained with reference to FIGS. 5–7. The second embodiment is also the crawler device 1 in a triangular form. It should be noted that the same components as in the first embodiment are given the identical symbols and numerals to omit the explanation thereof, and only the parts different from the first embodiment will be explained (ditto for the other embodiments of which details will be explained below).

Figure 5:
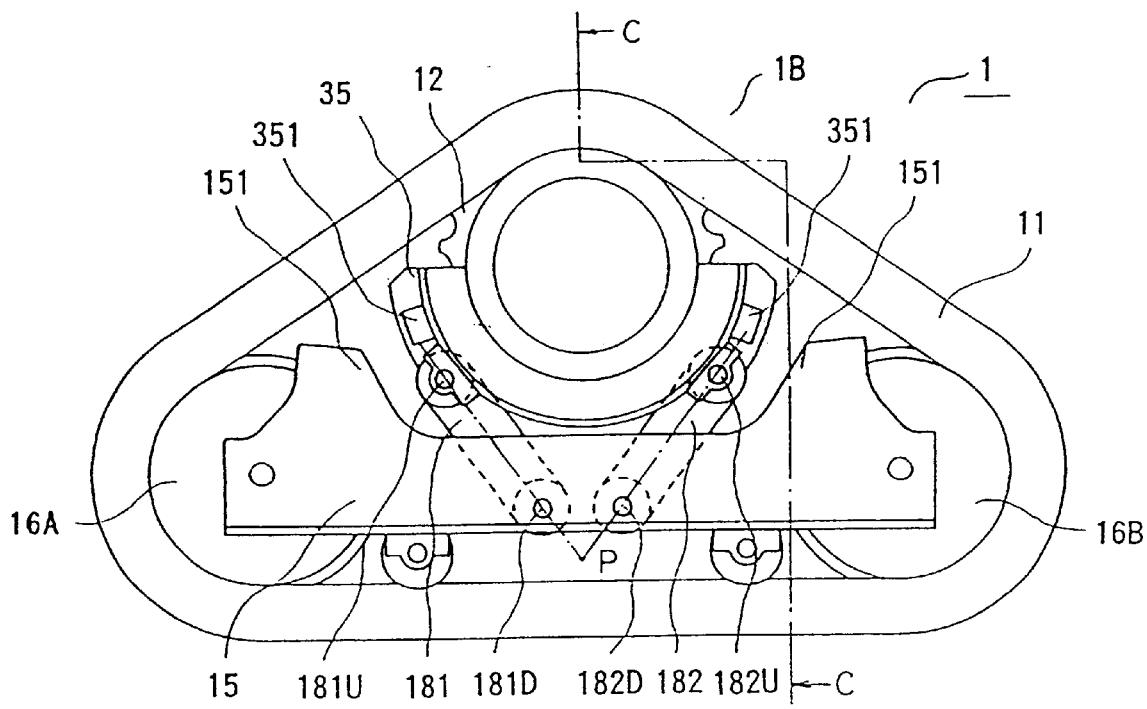
FIG. 5 is a side elevational view of a crawler device in a triangular form in a second embodiment according to the present invention.
Figure 6:
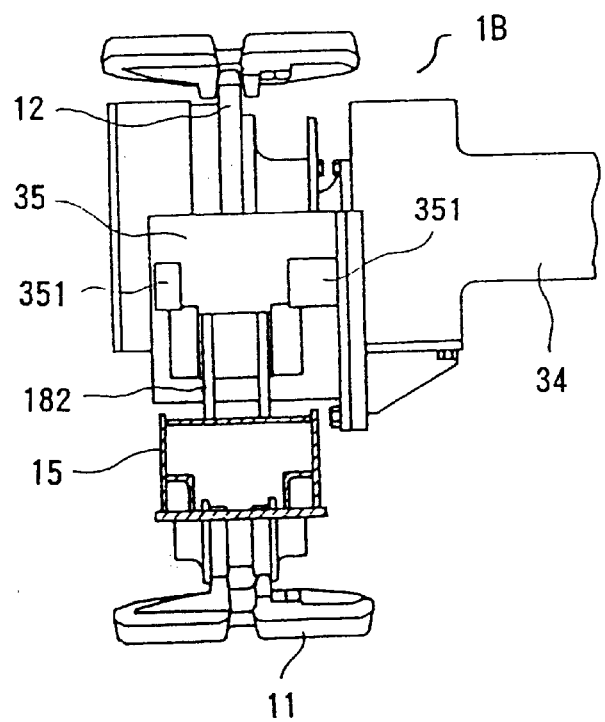
FIG. 6 is a sectional view taken along the C—C line in FIG. 5.

In FIGS. 5 and 6, the front end of a bracket 35, which is fixedly provided at the vehicle body 3 (see FIG. 4), is coupled to the forward part of the truck frame 15 via the front end link 181 by means of the coupling pins 181U and 181D, and the rear end of the bracket 35 is coupled to the rearward part of the truck frame 15 via the rear end link 182 by means of the coupling pins 182U and 182D. The distance L2 (see FIG. 1) between the coupling pins 181D and 182D is shorter than the distance L1 (see FIG. 1) between the coupling pins 181U and 182U (L2<L1), and a point of intersection of the axis of the front end link 181 and the axis of the rear end link 182 (specifically, a point of intersection P of an extension of the line connecting the coupling pins 181U and 181D and an extension of the line connecting the coupling pins 182U and 182D) is located inside the loop of the endless crawler belt 11. Stoppers 351 and 351 are fixedly provided at the front end and the rear end of the bracket 35, and stoppers 151 and 151 are provided at the front end and the rear end of the truck frame 15 so as to be abutted to the aforesaid stoppers 351 and 351 when the crawler device 1 swings greatly. The bracket 35 is fixedly provided at the axle beam 34 which is in the side of the vehicle body 3 as shown in FIG. 6. Specifically, the second embodiment is the rear end crawler device 1B coupled to the driving device. The aforesaid second embodiment has the following operational effects.

Figure 7:
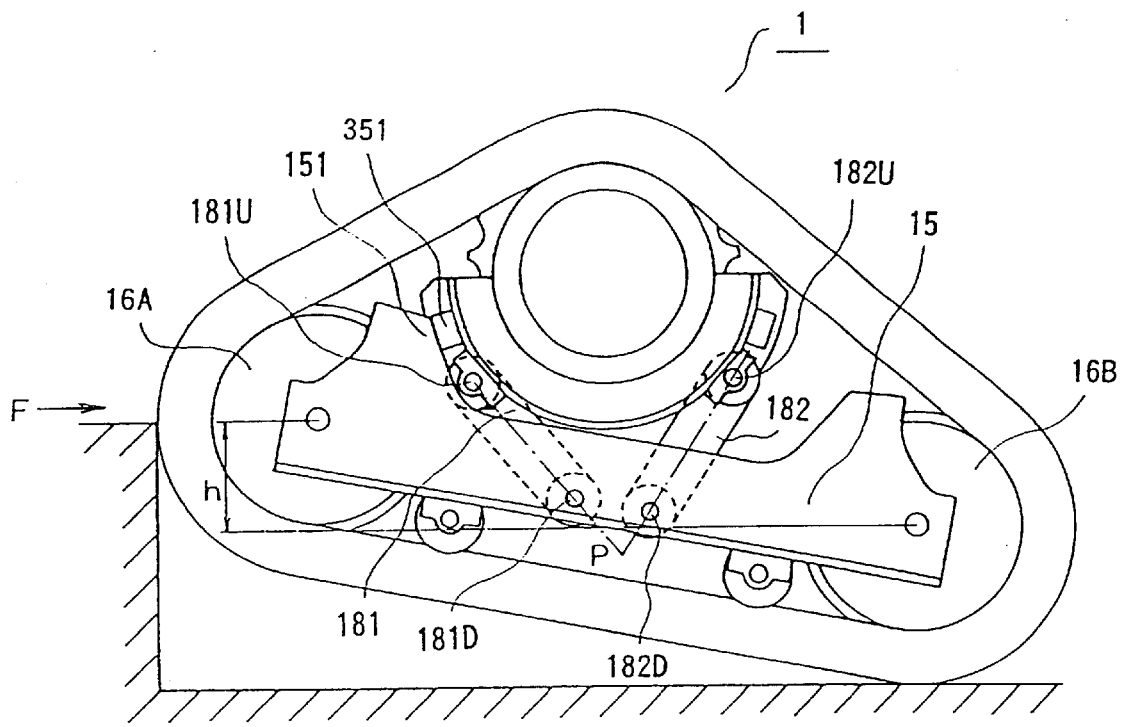
FIG. 7 is an explanatory view of the operation of the crawler device of FIG. 5.

As shown in FIG. 7, when the front end idler 16A collides with a bump on an uneven ground with large bumps and potholes, a gutter, or the like during traveling, and when the force F is exerted from the front, the truck frame 15 is moved toward the rear. At this time, an angle of swing of the crawler device 1 becomes larger according to the relationship of the aforesaid "L2<L1", and the relationship of the location of the point of intersection P, and the amount of the rising h of the front end idler 116A relative to the rear end idler 16B becomes larger. Accordingly, the crawler device 1 (specifically, the vehicle 2) can pass over a large bump. It should be noted that in this configuration, a great angle of swing is obtained; therefore, the stoppers 351 and 151 at either the front or the rear abut each other to control the swing within a proper angle. Specifically, the stoppers 351 and 151 constitute a swing control mechanism.

Figure 8:
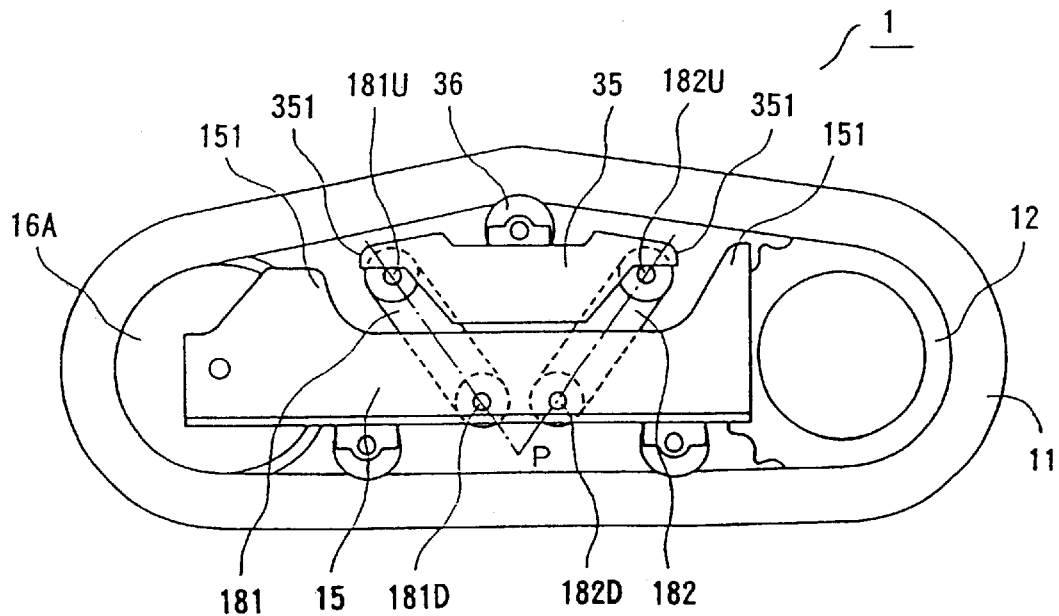
FIG. 8 is a side elevational view of a low drive type of crawler device in a third embodiment according to the present invention.

A third mechanism will be explained with reference to FIGS. 8–10. The third embodiment is a low drive type of crawler device 1. As shown in FIG. 8, the front end idler 16A is attached on the front end portion of the truck frame 15, and the sprocket 12, driven by a hydraulic motor (not illustrated), is attached at the rear end portion thereof. The idler 16A only means the front end idler 16A in the third embodiment. The front end of the bracket 35, which is fixedly provided at the vehicle body 3 (refer to FIG. 4), and the front portion of the truck frame 15 are coupled via the front end link 181 by means of the coupling pins 181U and 181D, and the rear end of the bracket 35 and the rear portion of the truck frame 15 are coupled via the rear end link 182 by means of the coupling pins 182U and 182D. A roller 36 is provided at the upper portion of the bracket 35. The crawler belt 11 is passed around the front end idler 16A, the sprocket 12, the front end roller 14A, the rear end roller 14B, and the upper end roller 36. The third embodiment also has the relationship "L2<L1" and the relationship that the point of intersection P is located inside the loop of the crawler belt 11, as in the second embodiment. Further, the stoppers 351 and 351 at the front and the rear ends of the bracket 35 and the stoppers 151 and 151 at the front and 31 the rear portions of the truck frame 15 constitute a swing control mechanism. The aforesaid third embodiment has the following operational effects.

Figure 9:
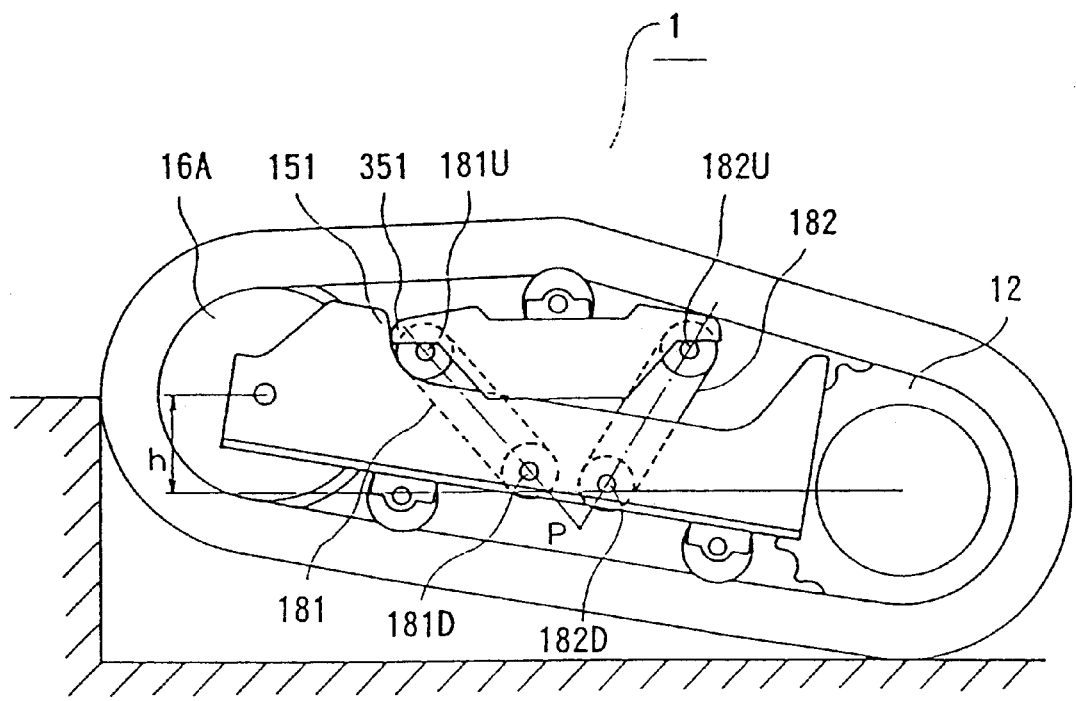
FIG. 9 is an explanatory view of the operation of the crawler device in FIG. 8.
Figure 10:
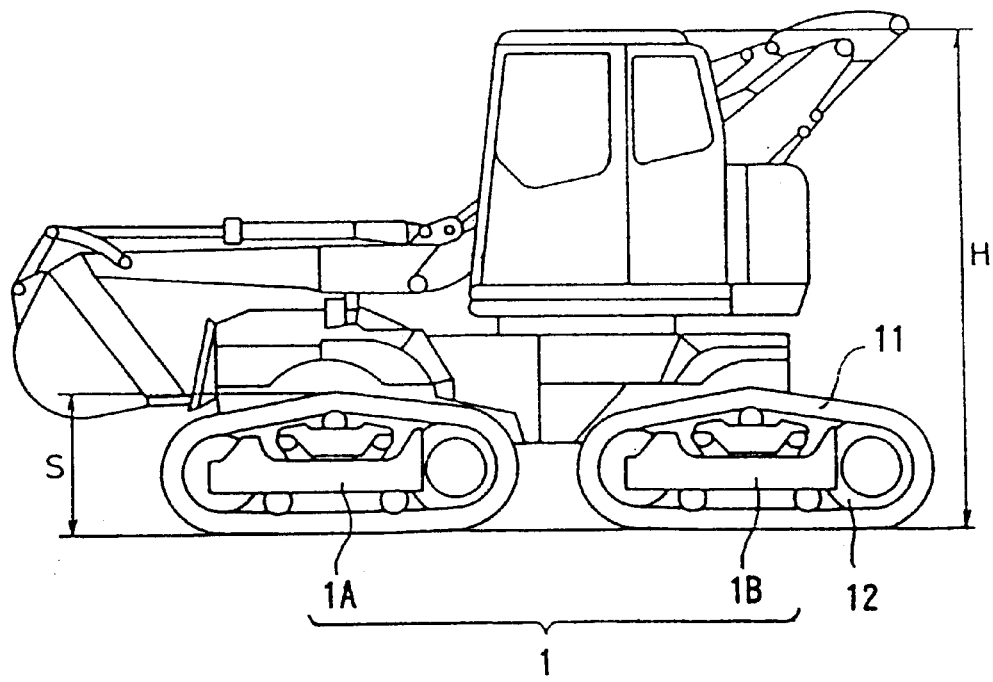
FIG. 10 is a side view of a vehicle equipped with the crawler device in FIG. 8.

As shown in FIG. 9, when the front end idler 16A collides with a bump on an uneven ground with large bumps and potholes, a gutter, or the like during traveling, the crawler device 1 swings as in the second embodiment (to be precise, the front end idler 16A ascends while the sprocket 12 descends), and the crawler device 1 can easily pass over even a large bump. If the angle of swing becomes greater, the stoppers 351 and 151 control the swing. In addition, the sprocket 12 is provided at the rear portion of the truck frame 15; therefore a height S of the crawler device 1 can be lowered as is shown in FIG. 10 to provide a so-called low drive type. Consequently, a height H of the vehicle 2 can be lowered by the lowered height of the crawler device 1; therefore stability is improved when traveling on an irregular ground. In addition, the angle at which the crawler belt 11 is passed around the sprocket 12 is increased; thereby reducing skipping pitch and separation of the crawler belt by the increased angle.

In the first, the second, and the third embodiments, the front end link 181 and the rear end link 182 have a fixed length, but they can be an expansion type as follows.

Figure 11:
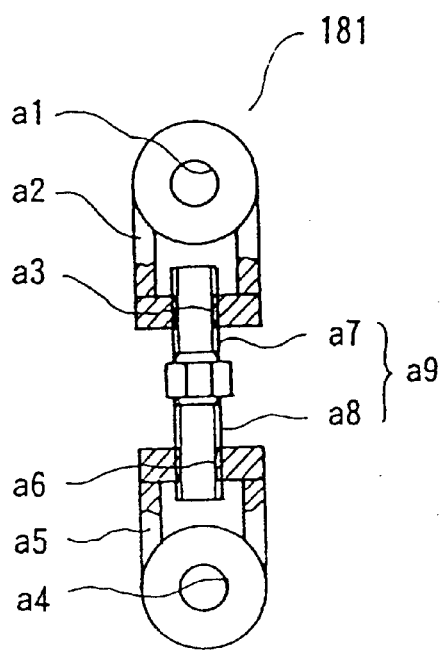
FIG. 11 is a fragmentary sectional view of a turn buckle type of link according to another embodiment of the present invention.

For example, as shown in FIG. 11, they can be a turnbuckle type. Specifically, a right hand screw hole a3 is provided at one end of a first joint a2, which has a coupling pin hole al at the other end thereof. Meanwhile, a left hand screw hole a6 is provided at one end of a second joint a5, which has a coupling pin hole a4 at the other end thereof. A screw a9, which has a right hand screw a7 at one end and has a left hand screw a5 at the other end, is screwed into the right hand screw hole a3 and the left hand screw hole a6. When the screw a9 is turned, the length of the front end link 181 or the rear end link 182 is reduced, and the crawler belt 11 is loosened. On the other hand, when the screw a9 is turned in the reverse direction, the front end link 181 or the rear end link 182 is extended, and the crawler belt 11 is tightened. Specifically, the attachment and detachment and the tension adjustment of the crawler belt 11 can be facilitated.

Figure 12:
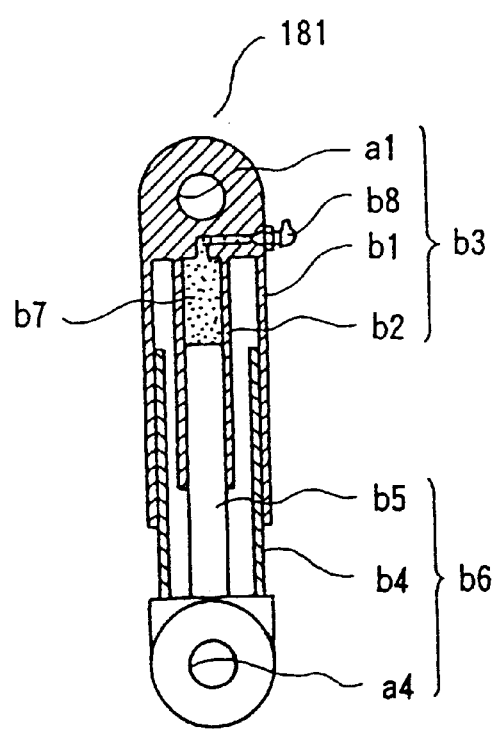
FIG. 12 is a fragmentary sectional view of a grease cylinder type of link according to another embodiment of the present invention.

Further, for example, as is shown in FIG. 12, the links can be a grease cylinder type. Specifically, this type is composed of a first member b3 having the coupling pin hole a1 at one end, an external cylinder b1 opened toward the other end, and a grease cylinder b2 which is provided inside the external cylinder b1 and is opened toward the other end, and a second member b6 having a coupling pin hole a4 at one end, an external cylinder b4 fitted into the external cylinder b1 at the other end, and a piston b5 which is fitted into the external cylinder b4 and is inserted into the grease cylinder b2. A grease nipple b8 is provided at one end of the first member b3, and grease b7 is injected into the cylinder b2 from this grease nipple b8. The grease nipple b8 has a valve (not illustrated).

When the valve is opened and the grease b7 in the grease cylinder b2 is discharged outside from the grease nipple b8, the length of the front end link 181 or the rear end link 182 is reduced, and the crawler belt 11 is loosened. On the other hand, when the valve is closed and the crease b7 is supplied into the grease cylinder b2 from the grease nipple b8, the front end link 181 or the rear end link 182 is extended, and the crawler belt 11 is tightened. Specifically, the attachment and detachment and the tension adjustment of the crawler belt 11 can be facilitated. In this type, a load in the axial direction is received by the crease 7, and a load in a bending direction is received by the external cylinders b1 and b4.

As for preferable mechanism for the first, the second, and the third embodiments, which only tightens the crawler belt, for example, the following various configurations can be shown as examples.

Figure 13:
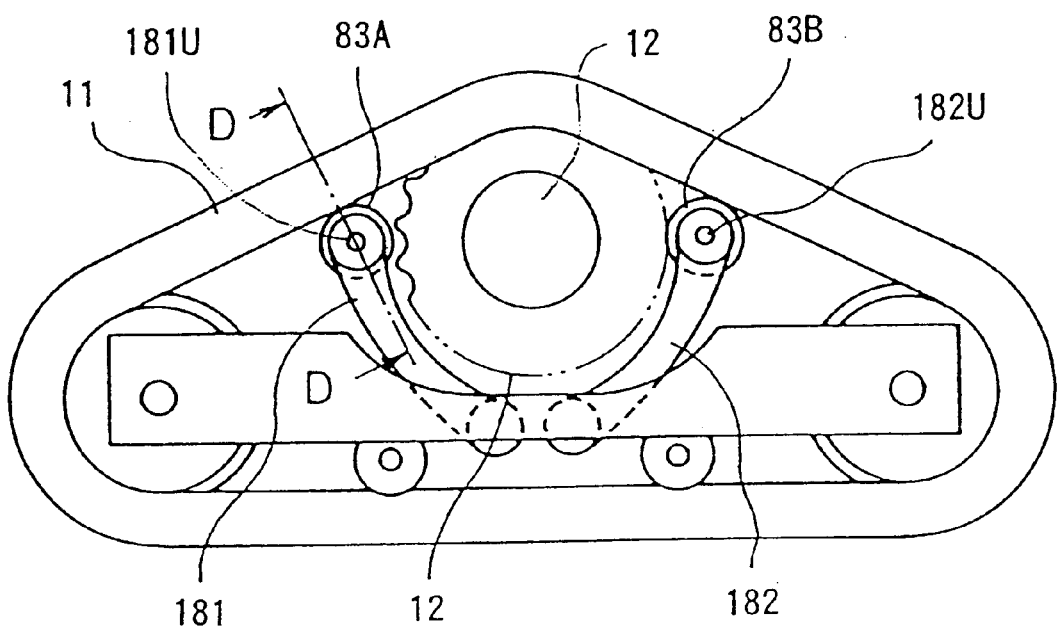
FIG. 13 is a side elevational view of a crawler device showing a first example of a crawler belt tightening mechanism according to another embodiment of the present invention.
Figure 14:
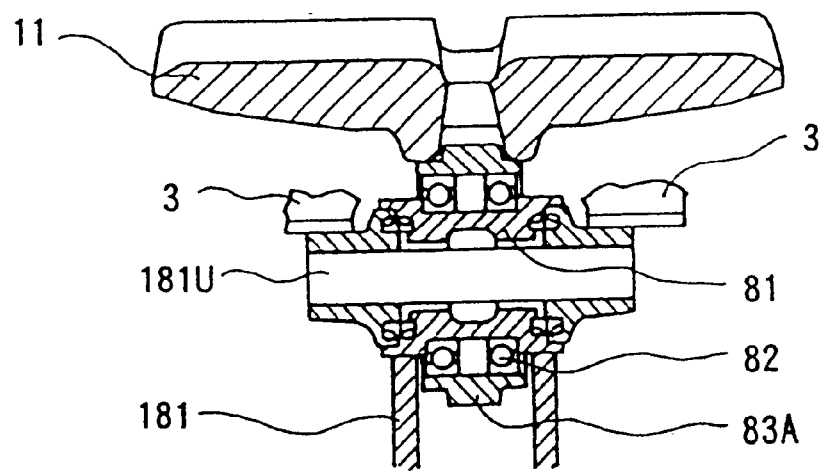
FIG. 14 is a sectional view taken along the D—D line in FIG. 13.
Figure 15:
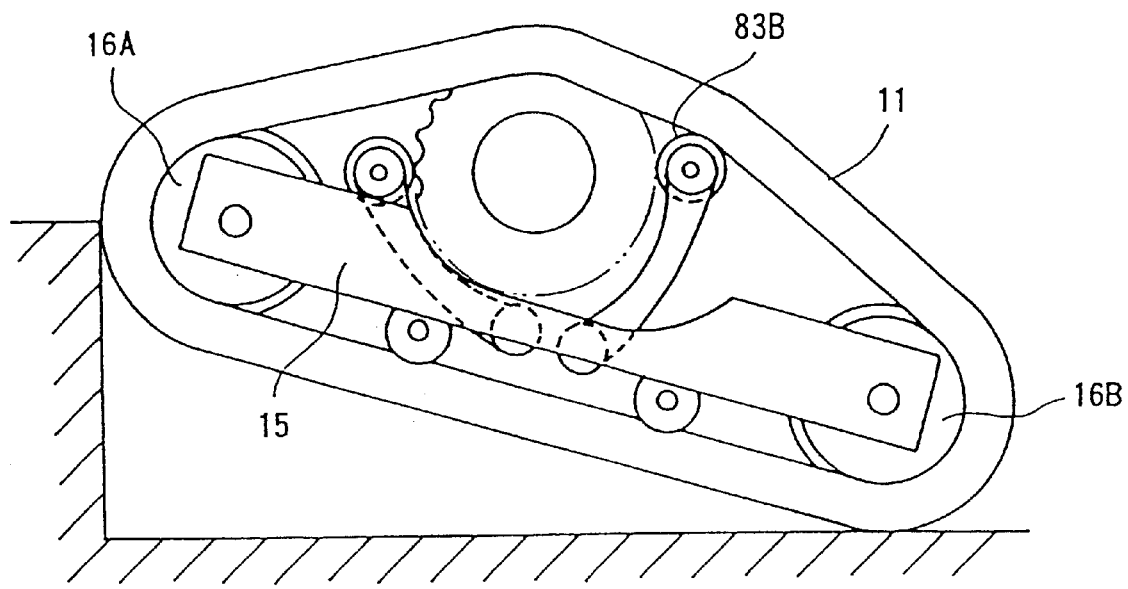
FIG. 15 is an explanatory view of the operation of the crawler device in FIG. 13.

(1) FIGS. 13–15 show a first example of a crawler belt tightening mechanism. As shown in FIGS. 13 and 14, the front end link 181 and the rear end link 182 are provided at the outer perimeters of the coupling pins 181U and 182U, and the upper rollers 83A and 83B are attached at the outer perimeters of the respective bosses 81 and 81 by the bearings 82 and 82 so as to be free to rotate. The upper rollers 83A and 83B support the lower surface of the upper portion of the crawler belt 11 with the sprocket 12 between them. In the third embodiment, the rollers 83A and 83B support the lower surface of the upper portion of the crawler belt 11 with the upper roller 36 between them instead of the sprocket 12.

Specifically, during traveling, as shown in FIG. 15, when the front end idler 16A collides with a bump or the like, and the truck frame 15 swings, the crawler belt 11 tends to be slightly loosened, but the rear end upper roller 83B lifts the crawler belt 11 and gives tension to the crawler belt 11. Accordingly, the crawler belt 11 does not loosen. Specifically, skipping pitch or the like caused by a loosened belt can be prevented on the sprocket 12.

Figure 16:
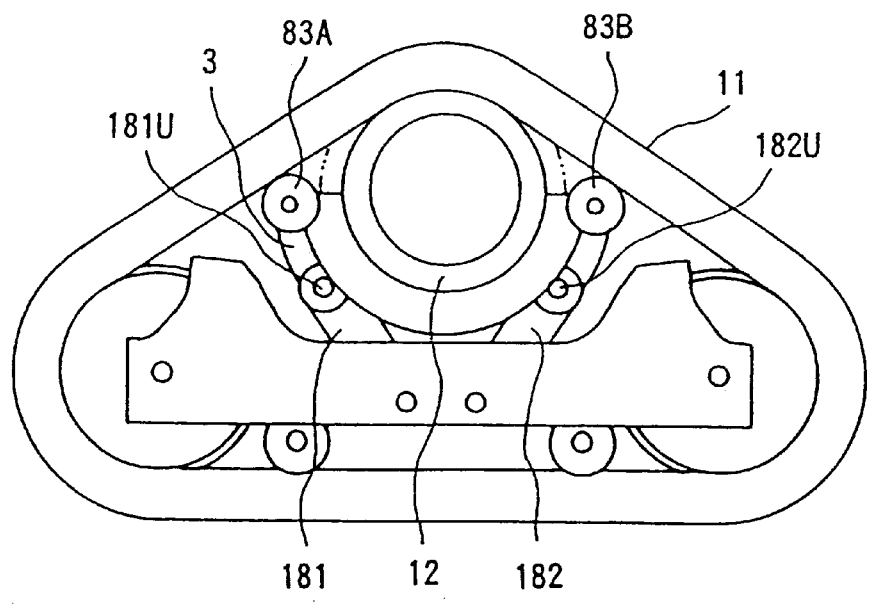
FIG. 16 is a side elevational view of a crawler device showing a second example of a crawler belt tightening mechanism according to another embodiment of the present invention.
Figure 17:
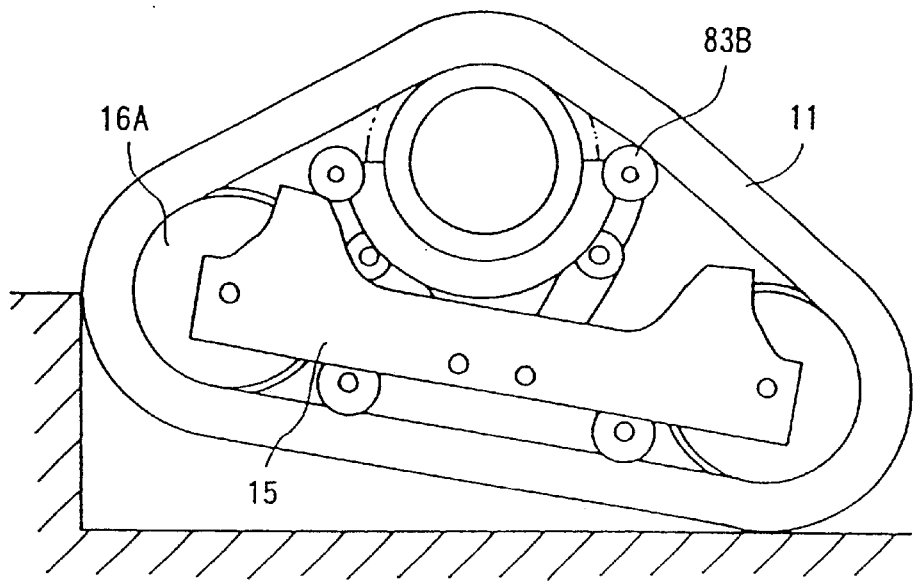
FIG. 17 is an explanatory view of the operation of the crawler device in FIG. 16.

(2) FIGS. 16 and 17 show a second example of the crawler belt tightening mechanism. In the first example, the front and rear upper rollers 83A and 83B are provided at the coupling pins 181U and 182U, but in the second example, as shown in FIG. 16, they are provided at the side of the vehicle body 3 corresponding to the positions which are at both sides of the sprocket 12 and away from the coupling pins 181U and 182U. In the second example, as shown in FIG. 17, as in the first example, when the front end idler 16A collides with a bump or the like, and the truck frame 15 swings, the crawler belt 11 ends to be slightly loosened, but the rear end upper roller 83B lifts the crawler belt 11 and gives tension to the crawler belt 11. Accordingly, the crawler belt 11 is not loosened. Specifically, skipping pitch or the like caused by a loosened crawler belt on the sprocket 12 can be prevented.

Figure 18:
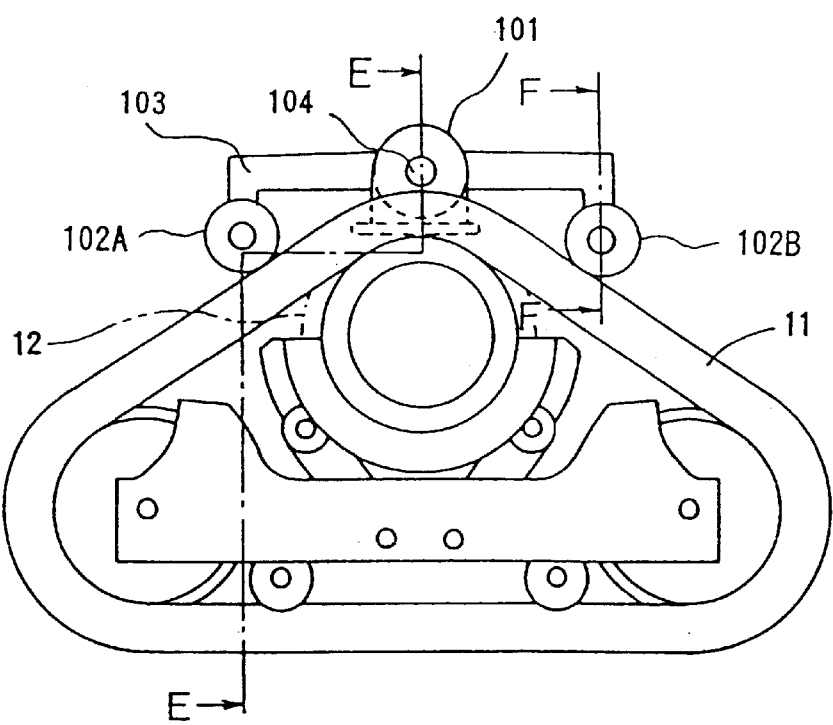
FIG. 18 is a side elevational view of a crawler device showing a third example of a crawler belt tightening mechanism according to the present invention.
Figure 19:
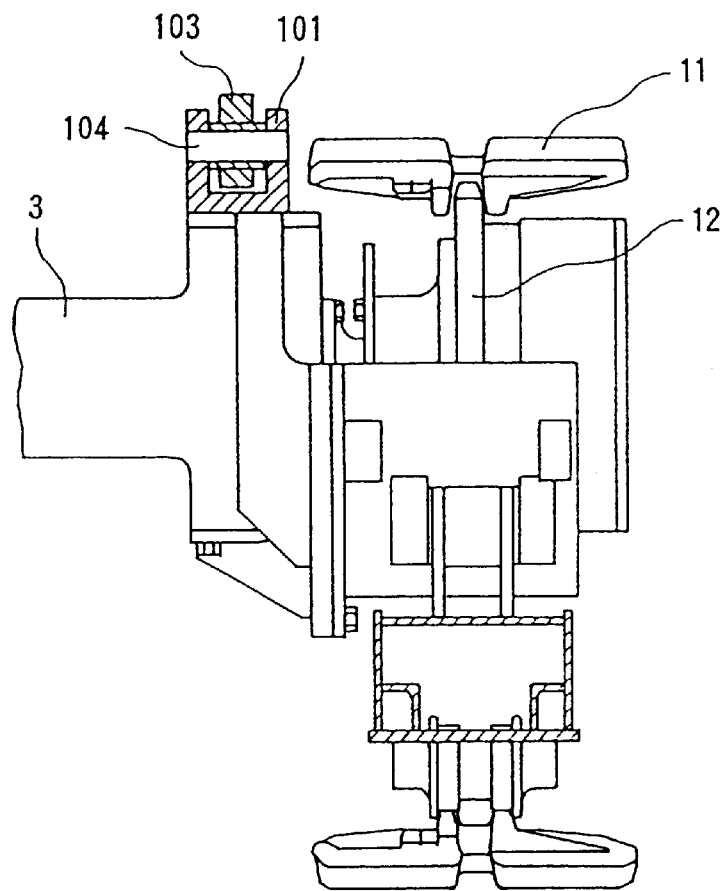
FIG. 19 is a sectional view taken along the E—E line in FIG. 18.
Figure 20:
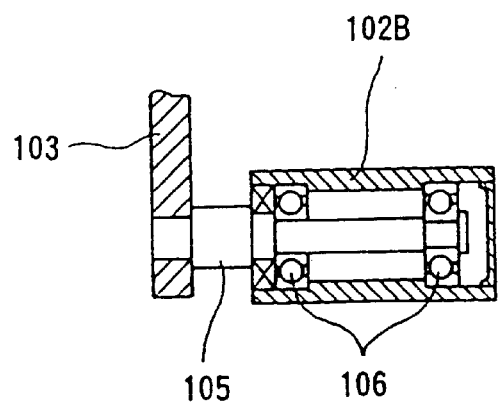
FIG. 20 is a sectional view taken along the F—F line in FIG. 18.

(3) FIGS. 18–21 are a third example of the crawler belt tightening mechanism. As shown in FIGS. 18 and 19, a bracket 101 is fixedly provided at the side of the vehicle body 3 at the top of the sprocket 12. The pivot pin 104 on the bracket 101 supports a center portion of an arm 103, which has rollers 102A and 102B rotatably attached at both ends, so as to freely swing. The rollers 102A and 102B press, in a direction of the sprocket 12, the upper surface of the portion of the crawler belt 11 which is passed around the upper portion of the sprocket 12 in a direction of the sprocket 12. FIG. 20 is a sectional view of the roller 102B portion, and the roller 102B is rotatably attached by means of bearings 106 to a shaft 105, which is fixedly provided at the front end of the arm 103.

Figure 21:
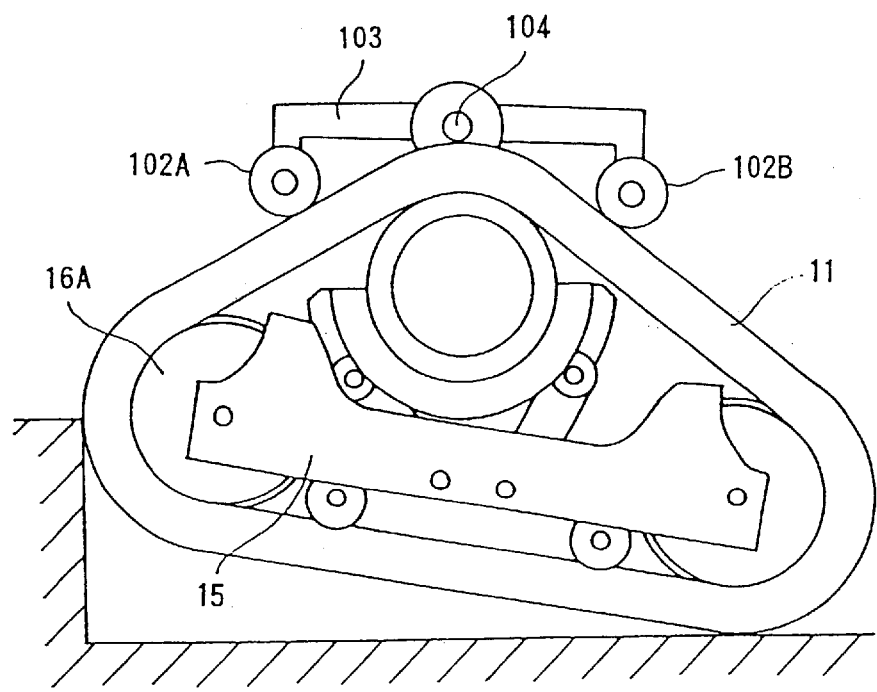
FIG. 21 is an explanatory view of the operation of the crawler device in FIG. 18.

Specifically, during traveling, as shown in FIG. 21, when the front end idler 16A collides with a bump or the like and the truck frame 15 swings, the triangular form of the crawler belt 11 is deformed and a slight looseness tends to occur. At this time, following the deformation of the crawler belt 11, the arm 103 swings about the shaft 104. Here, the rollers 102A and 102B always abut the upper surface of the crawler belt 11, and press the crawler belt 11 in the direction of the sprocket 12. Therefore, the crawler belt 11 is not loosened. Specifically, skipping pitch or the like caused by a loosened crawler belt on the sprocket 12 can be prevented.

Figure 22:
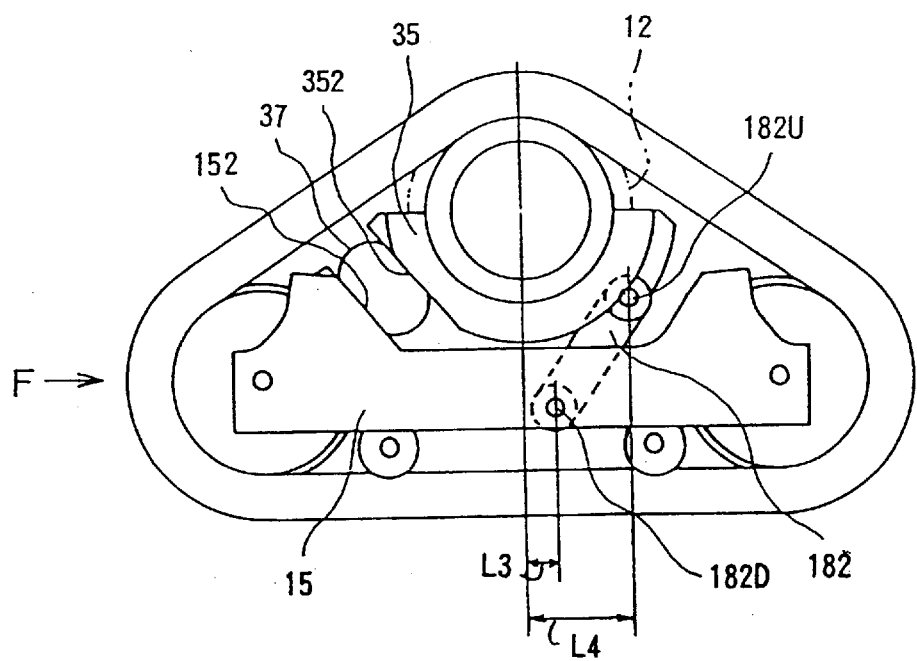
FIG. 22 is a side elevational view of a crawler device showing a shock absorbing device according to another embodiment of the present invention.

Next, representative examples of a shock absorbing device, preferable for the first, the second, and the third embodiments, are described with reference to FIGS. 22 and 23. As shown in FIG. 22, an elastic member 37, such as rubber, is attached between a bearing surface 352 of the bracket 35 (see FIG. 5 in the second embodiment or FIG. 8 in the third embodiment. Corresponding to the vehicle body 3 in FIG. 1 in the first embodiment.) in front of the sprocket 12 and a bearing surface 152, provided on the upper surface of the front portion of the truck frame 15. The rear end link 182 is coupled to a portion of the bracket 35 at the rear of the sprocket 12 by means of the coupling pin 182U, and the other end of the rear end link 182 is coupled to the rear portion of the truck frame 15 by means of the coupling pin 182D. The relationship between a horizontal distance L4 from a vertical line, passing through the center of the sprocket 12 up to the center of the coupling pin 182U and a horizontal distance L3, from the aforesaid vertical line up to the center of the coupling pin 182D, is "L3<L4".

Figure 23:
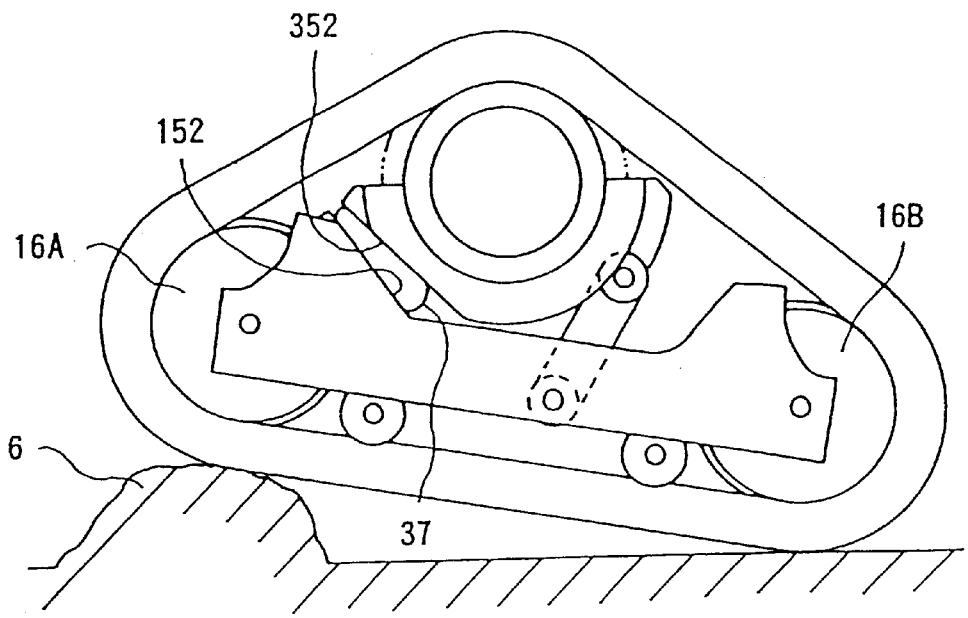
FIG. 23 is an explanatory view of the operation of the crawler device in FIG. 22.

Specifically, during traveling, when the external force F is exerted on the front end idler 16A from the front, or when the front end idler 16A runs on to the obstacle 6 on the ground as shown in FIG. 23, the elastic member 37 is compressed and deformed to absorb the shock. Accordingly, the shock is decreased, and riding comfort is increased. Further, the front end idler 16A is ascended while the rear end idler 16B is descended; therefore, the crawler device can easily move over a bump such as the obstacle 6.

Figure 24:
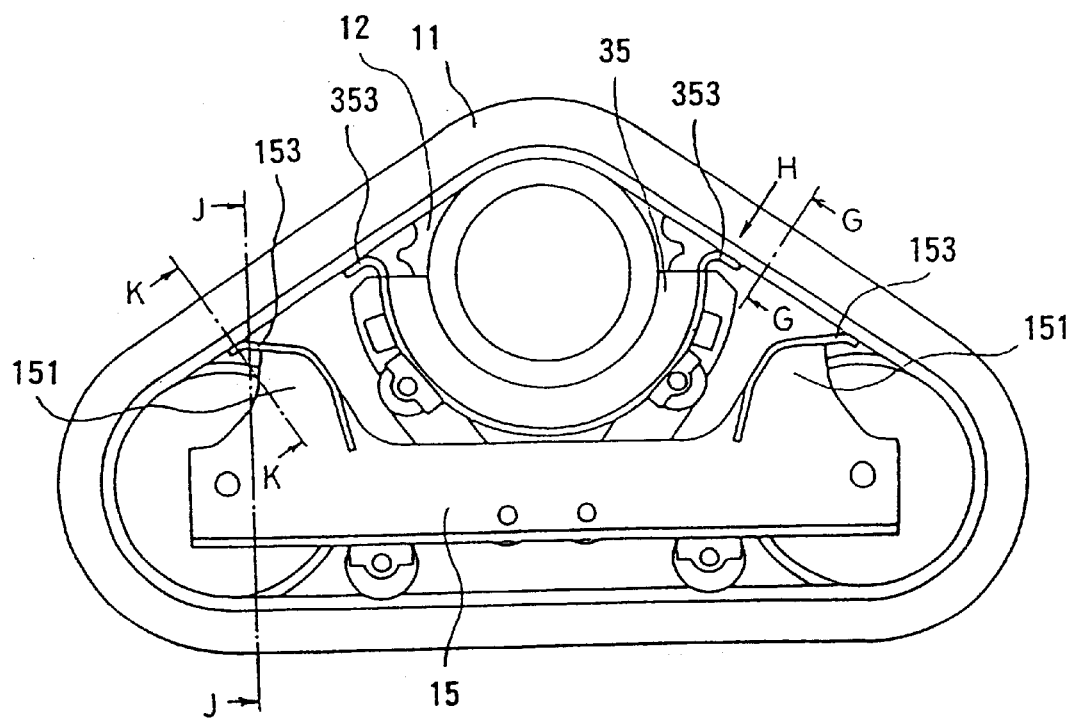
FIG. 24 is a side elevational view of the crawler device showing a mud scraper mechanism according to another embodiment of the present invention.
Figure 25A:
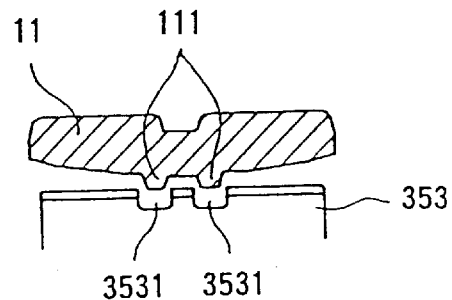
FIG. 25A is a sectional view taken along the G—G line in FIG. 24.
Figure 25B:
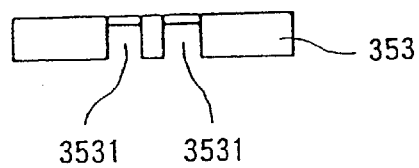
FIG. 25B is a view seen in a direction of the arrow H in FIG. 24.
Figure 26A:
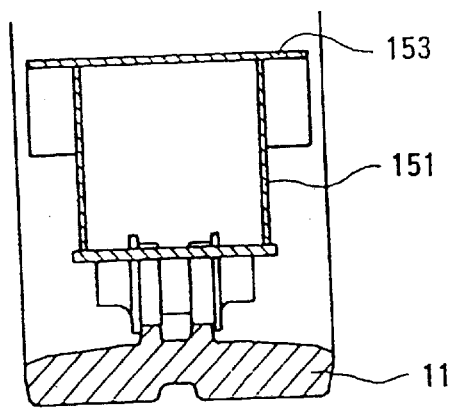
FIG. 26A is a sectional view taken along the J—J line in FIG. 24.
Figure 26B:
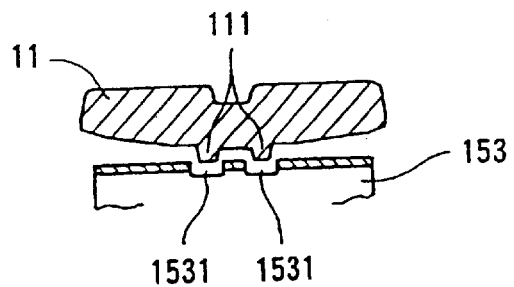
FIG. 26B is a sectional view taken along the K—K line in FIG. 24.

Next, representative examples of a mud scraping mechanism, preferable for the first, the second, and the third embodiments, will be described with reference to FIGS. 24, 25A, 25B, 26A, and 26B. In FIG. 24, first scrapers 3S3 and 353 are provided at the upper end portions of the bracket 35, which is fixedly provided at the vehicle body 3 (see FIG. 4), at positions in front of and at the rear of the sprocket 12. The ends thereof are positioned to the inner surface of the crawler belt 11, and as shown in FIGS. 25A and 25B, notches 3531 and 3531, for escaping a raised portion 111 of the crawler belt 11, are provided. The width of each of the first scrapers 353 and 353 almost equals the width of the crawler belt 11. In this example, as shown in FIG. 24, second scrapers 153 and 153 are provided at the front and rear portions of the truck frame 15. The upper ends of the second scrapers 153 and 153 are also close to the inner surface of the crawler belt 11, and as shown in FIG. 26A, end second scraper 153 is fixedly provided at the respective stopper 151 of the truck frame 15, and the width thereof almost equals the width of the crawler belt 11. Further, as shown in FIG. 26B, the notches 1531 and 1531, for escaping the raised portions 111 which are provided at the crawler belt 11, are provided in the upper end of the second scraper 153.

Specifically, both of the first scrapers 353 and the second scrapers 153 scrape earth and sand which are accumulating on the inner surface of the crawler belt 11 when the crawler belt 11 is rotated. Accordingly, earth and sand is prevented from being caught in the portion between the crawler belt 11 and the sprocket 12. Thereby skipping pitch of the crawler belt 11 on the sprocket 12 is prevented. Further, abrasion, breakage of a seal or the like, hydraulic leakage, and the like, are prevented.

Figure 27:
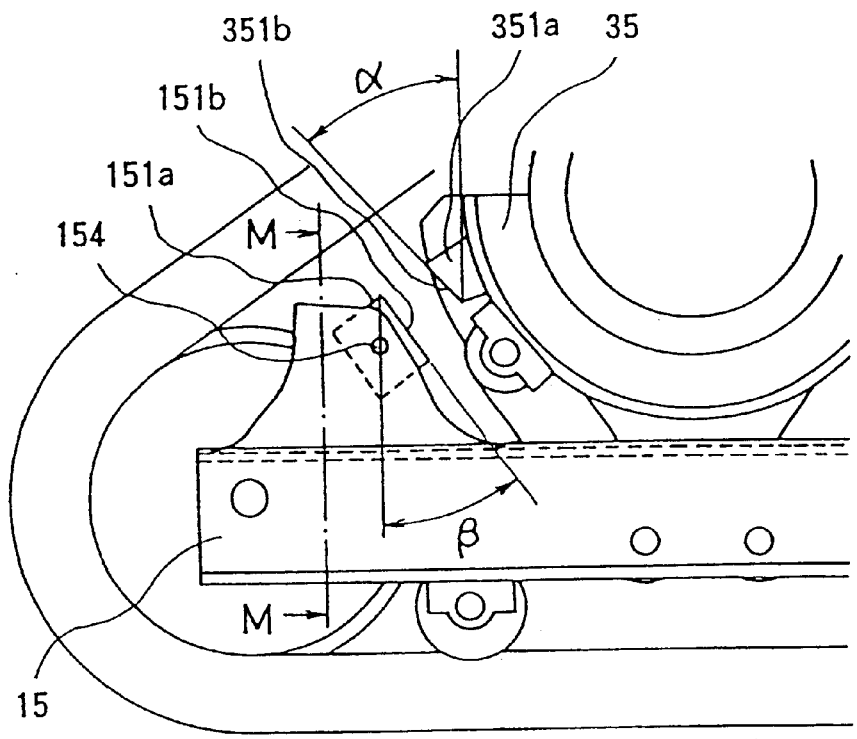
FIG. 27 is a side elevational view of an essential part of a crawler device showing a second example of a swing control mechanism according to another embodiment of the present invention.
Figure 28:
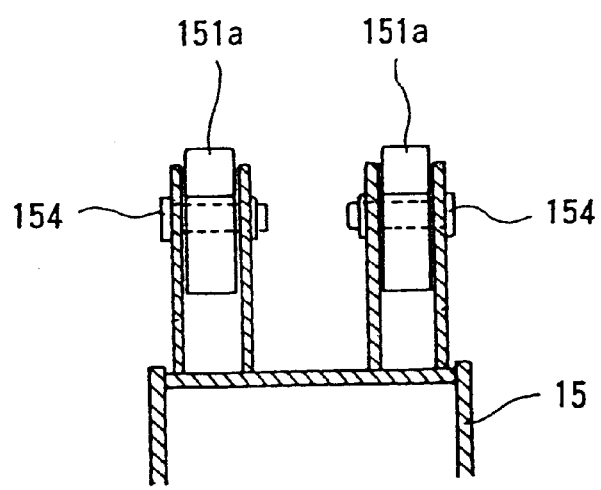
FIG. 28 is a sectional view taken along the M—M line in FIG. 27.

Next, a second example of a swing control mechanism will be explained. As shown in FIGS. 27 and 28, a pair of stoppers 351$a$ and 351$a$ are fixedly attached forward of the bracket 35, which is fixedly provided at the vehicle body 3 (see FIG. 4), in parallel relative to the width direction of the vehicle body 3. Meanwhile, a pair of stoppers 151$a$ and 151$a$ are rotatably attached at the upper surface of the front end of the truck frame 15 in parallel to each other by means of pins 154 and 154. When the truck frame 15 swings with the front part going up, both of the stoppers 351$a$ and 151$a$ are abutted to each other. An abut surface 351$b$ of the stopper 351$a$ is angled at an angle $\alpha$ relative to a vertical line. The pin 154 is located at a position higher than the position of the center of gravity of the stopper 151$a$ by a predetermined distance, and an abut surface 151$b$ for the abut surface 351$b$ of the stopper 351$a$ is angled at an angle $\beta$ relative to a vertical line. Accordingly, the stopper 151$a$ always keeps the angle $\beta$ relative to the vertical line irrespective of the swing of the truck frame 15. Further, "$\alpha > \beta$". It should be noted that a similar stopper device is also provided in the rear of the bracket 35 and the truck frame 15.

Figure 29A:
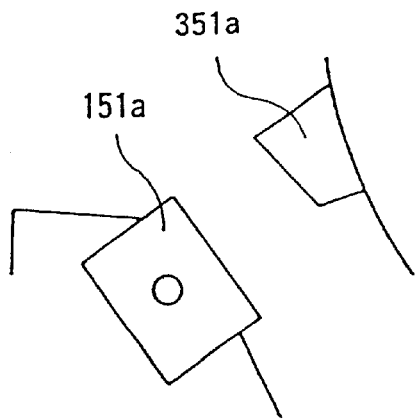
FIGS. 29A, 29B, and 29C are explanatory views of the operation of the swing control mechanism in FIG. 27.
Figure 29B:
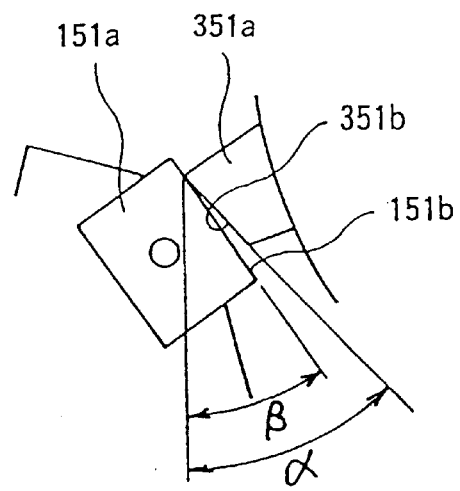
Figure 29C:
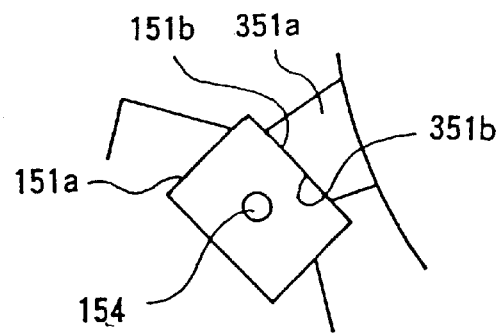

Specifically, according to the aforesaid second example of a swing control mechanism, the following operational effects are obtained. In a normal situation, as shown in FIG. 29A, both of the stoppers 351$a$ and 151$a$ are spaced from each other. When the truck frame 15 swings and the angle of swing reaches a predetermined value, as shown in FIG. 29B, the abut surface 351$b$ of the stopper 351$a$ and the abut surface 151$b$ of the stopper 151$a$ start to abut each other. In this situation, as described above, the abut surface 351$b$ of the stopper 351$a$ is angled at the angle $\alpha$ relative to a vertical line, while the abut surface 151$b$ of the stopper 151$a$ is angled at the angle $\beta$ relative to a vertical line, and "$\alpha > \beta$". Therefore the abut surface 351$b$ of the stopper 351$a$ abuts the upper end portion of the abut surface 151$b$ of the stopper 151$a$ at first. When the truck frame 15 swings further, as shown in FIG. 29C, the stopper 151$a$ rotates around the pin 154, and the abut surface 351$b$ of the stopper 351$a$ abuts the entire surface of the abut surface 151$b$ of the stopper 151$a$. Thereby earth and sand stuck to the abut surface is removed downwardly, and the accumulation of earth and sand on either of the abut surfaces 351$b$ and 151$b$ is eliminated. Accordingly, a decrease in the angle of swing of the truck frame 15, caused by the accumulation of earth and sand on the abut surfaces 351$b$ and 151$b$, is prevented; and excellent traveling is secured.

Figure 30:
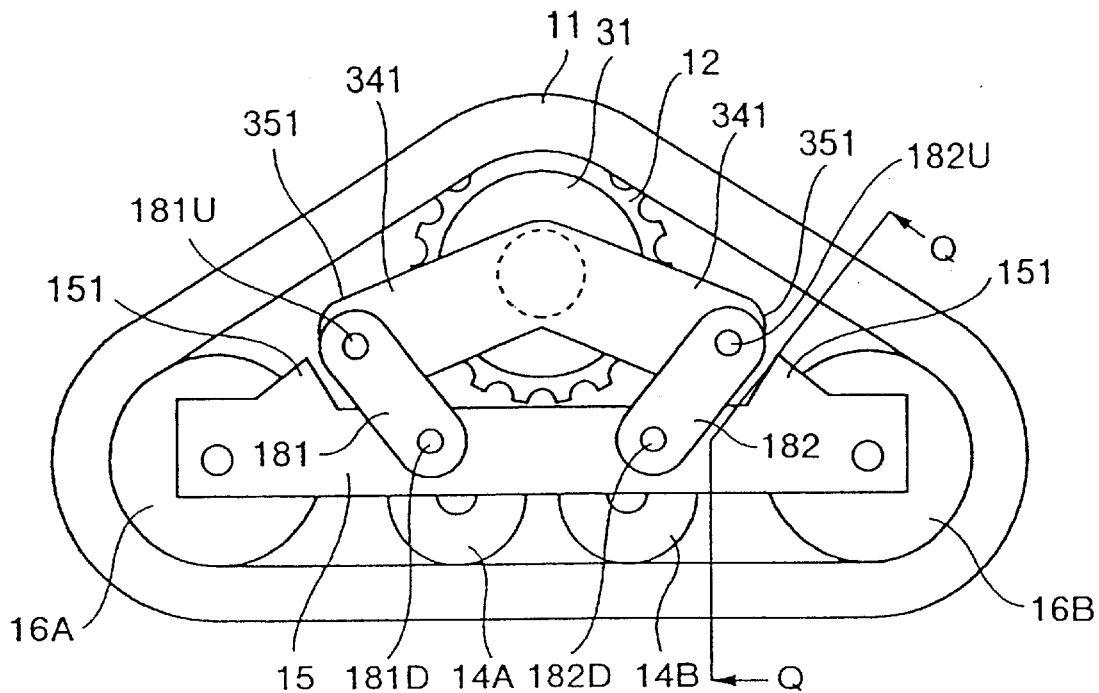
FIG. 30 is a side elevational view of the crawler device in a triangular form according to another embodiment of the present invention.
Figure 31:
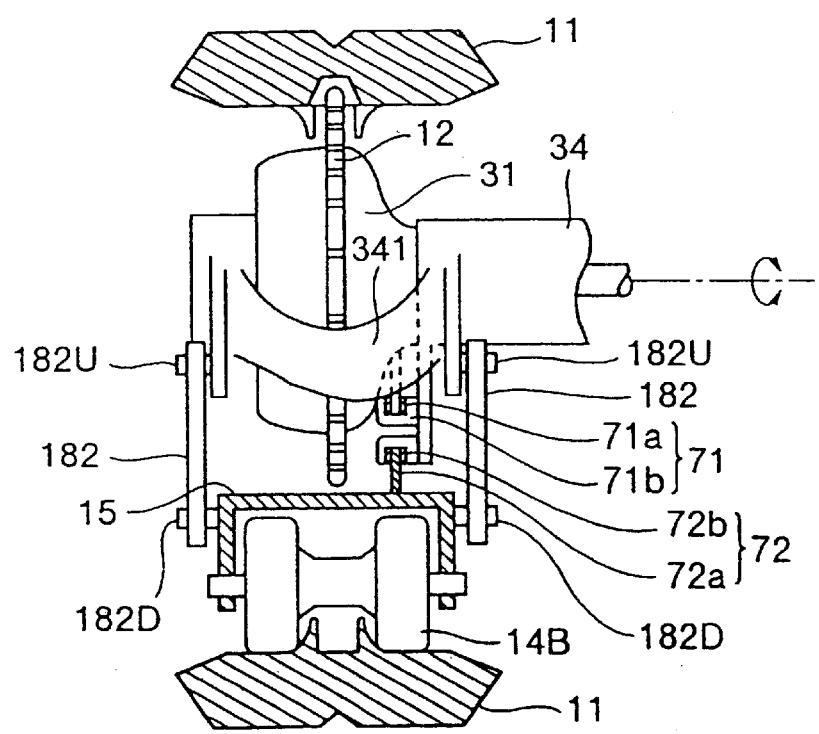
FIG. 31 is a sectional view taken along Q—Q line in FIG. 30.

Next, examples of a mechanism, preferable for supporting a working vehicle of a heavy weight, will be described with reference to FIGS. 30–32, 34, and 35. In FIGS. 30 and 31, a wheel hub 31 is rotatably provided at an axle beam 34. The wheel hub 31 has the sprocket 12 on the outer perimeter thereof, and the crawler belt 11 is passed around the outer perimeter of the sprocket 12. The axle beam 34 is provided so as to go around the outside of the wheel hub 31 and the sprocket 12 to extend outwardly, and has an extendedly provided member 341. The extendedly provided member 341 is coupled to the front end link 181 by means of the coupling pin 181U, and is coupled to the rear end link 182 by means of the coupling pin 182U. The stoppers 351 and 351 are provided at the front and the rear portions of the extendedly provided member 341, and the stoppers 151 and 151 are provided at the front and the rear portions of the truck frame 15 so as to abut the aforesaid stoppers 351 and 351.

Figure 32:
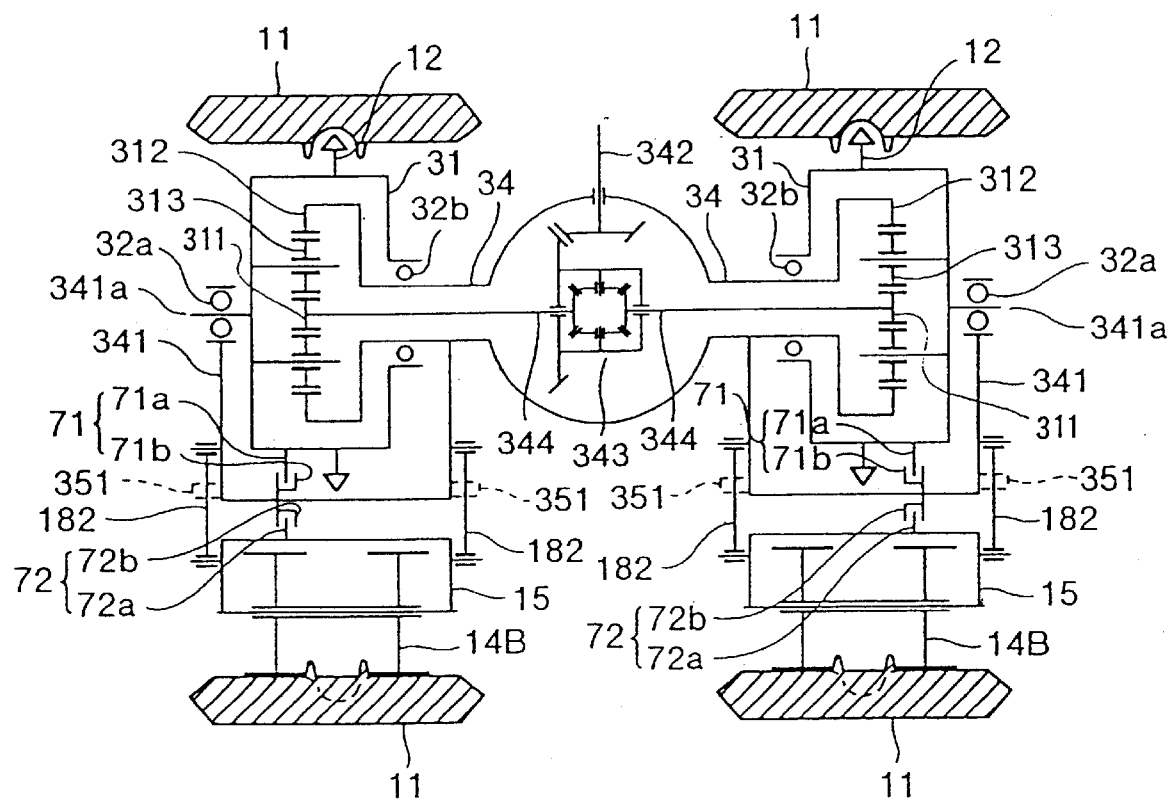
FIG. 32 is an explanatory diagram of a power train of the crawler device in FIG. 30.

The inner configurations of the axle beam 34 and the wheel hub 31 will be explained with reference to FIG. 32. In order to make the explanation easier, FIG. 32 is a power train diagram (FIGS. 33–35 described below are also power train diagrams). As shown in FIG. 32, the axle beam 34 includes a differential 343, which is rotationally driven by a drive shaft 342 led from a transmission (not illustrated), and propeller shafts 344 and 344 extend from the differential 343 in the right and left directions of the vehicle body 3. The outer ends of both of the propeller shafts 344 are sun gears 311 of planetary gear trains contained in the wheel hubs 31. A ring gear 312 of the planetary gear train is fixed at the axle beam 34 and is not able to rotate. A planetary gear 313 of the planetary gear train is meshed with the sun gear 311 and the ring gear 312. A planetary carrier of the planetary gear train, which supports the planetary gear 313, is the aforesaid wheel hub 31. Accordingly, the rotational force of the propeller shaft 343 is decreased at the planetary gear train, and rotationally drives the sprocket 12 through the wheel hub 31 to rotate the crawler belt 11. Here, an external outer end portion 341$a$ has a bearing 32$a$, and supports the wheel hub 31 from the outside. The wheel hub 31 is also supported by a bearing 32$b$ fitted onto the axle beam 34 from the side of the vehicle body 3. It should be noted that a reduction gear contained in the wheel hub 31 is not necessarily a planetary gear train, and an ordinary reduction gear, simply combining a plurality of gears, can be suitable.

Figure 46:
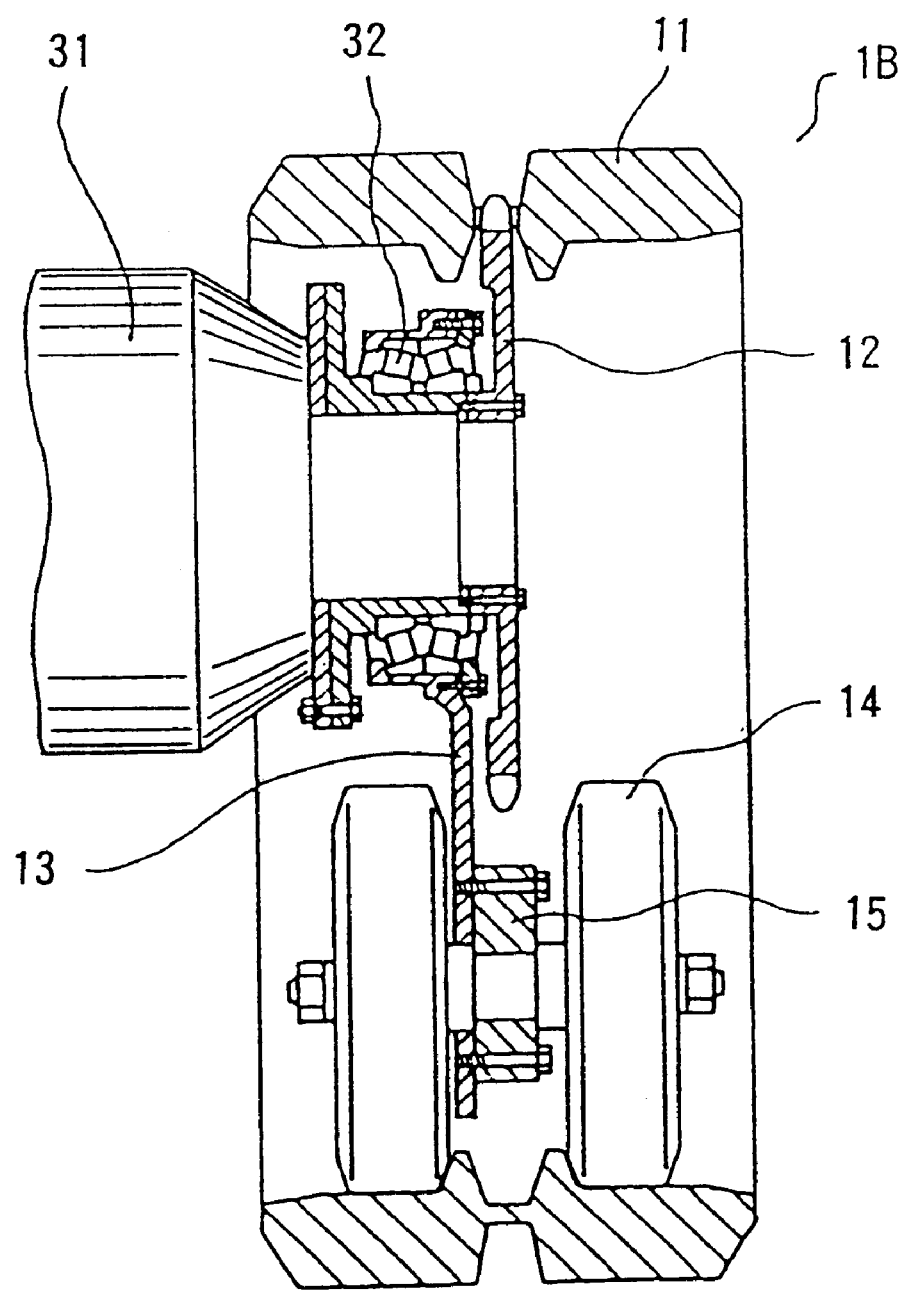
FIG. 46 is a sectional view taken along the A—A line in FIG. 45.
Figure 47:
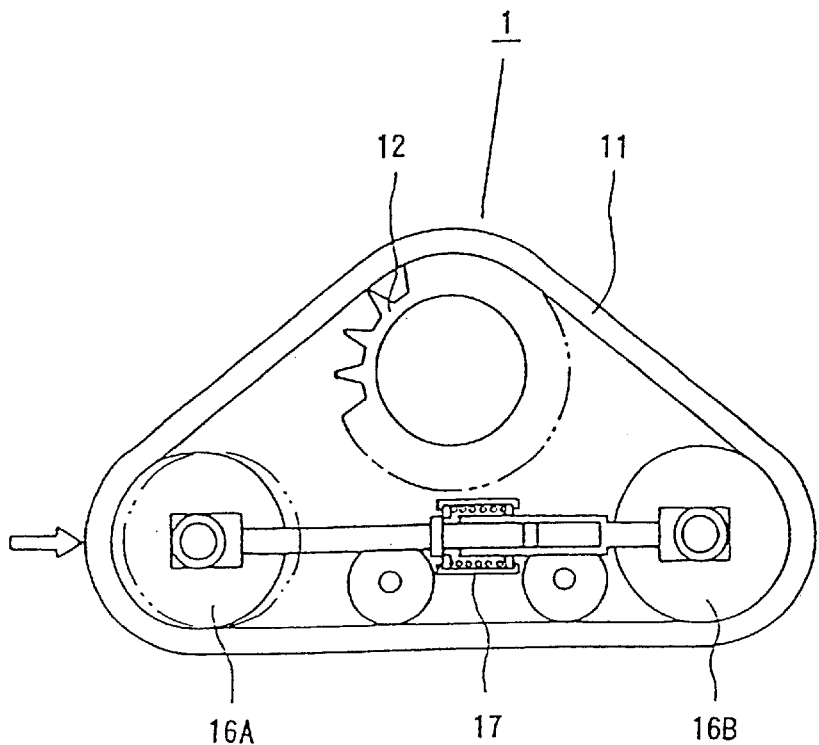
FIG. 47 is a schematic side elevational view of the crawler device in FIG. 45.
Figure 48:
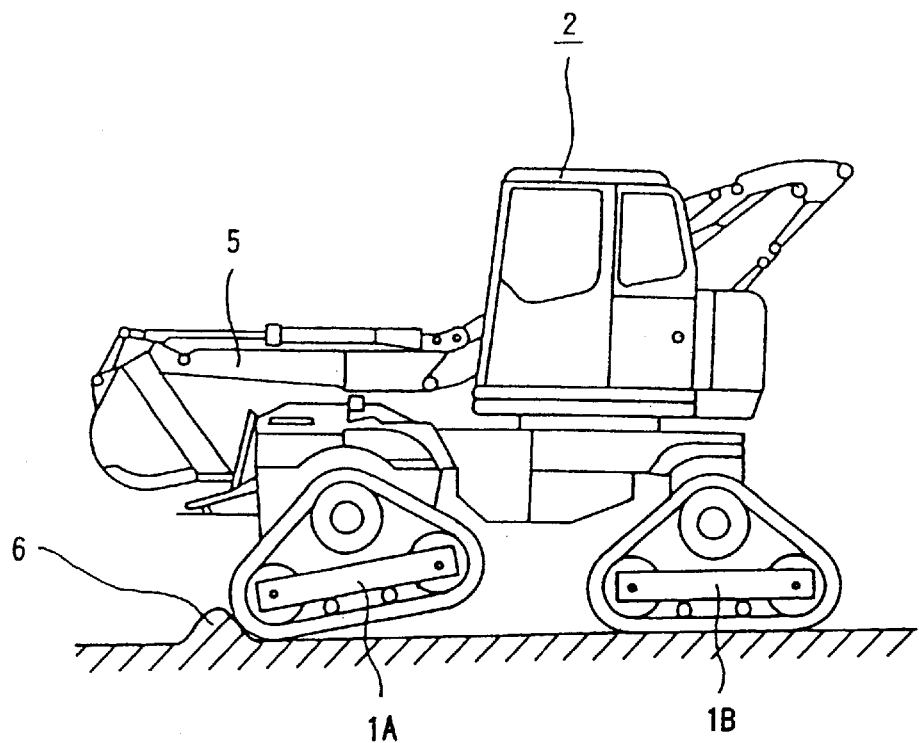
FIG. 48 is a view of the operation of the working vehicle in FIG. 45.

The operational effects of the aforesaid examples of the configuration will be explained, comparing with the prior art in FIG. 33. It should be noted that in order to facilitate the comparison, FIG. 33 includes the configuration in FIG. 46, which is the prior art, and is composed in accordance with the aforesaid example of the configuration in FIG. 32.

Figure 33:
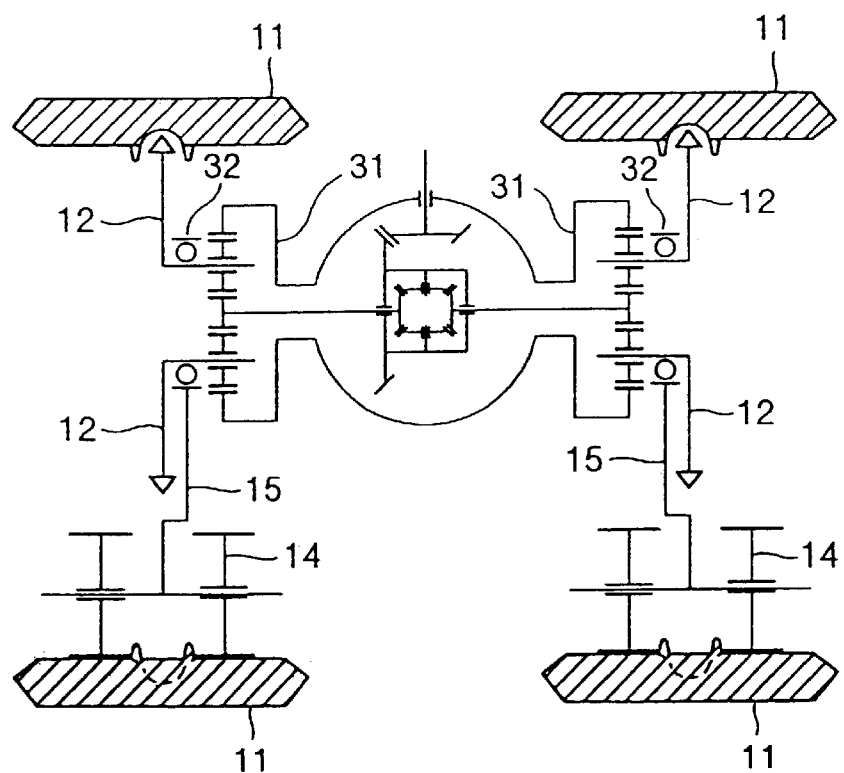
FIG. 33 is an explanatory diagram when the conventional power train is applied to the crawler device in FIG. 30.
Figure 36:
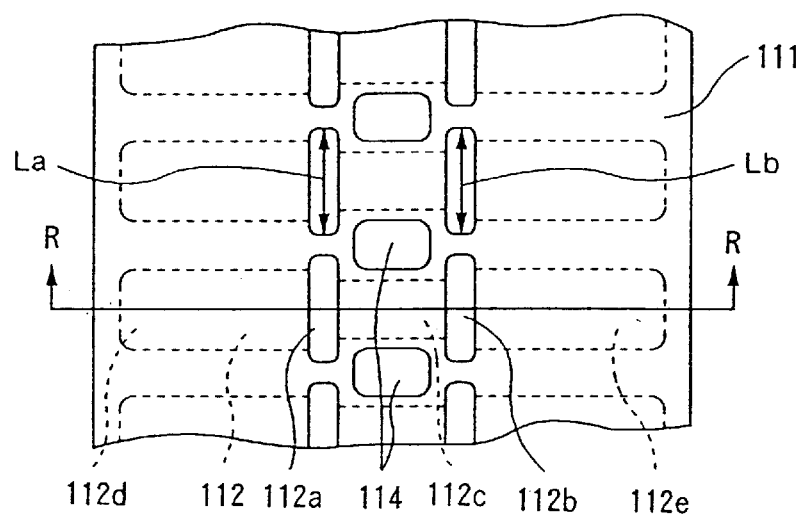
FIG. 36 is a plan view of a crawler belt according to the embodiments of the present invention.

As shown in FIG. 33, in the prior art, as described above, first of all, the vehicle body 3 is supported on the truck frame 15 with the bearing 32, which is located nearer to the side of the vehicle body 3 than to the sprocket 12. Accordingly, unless the wheel hub 31 is highly strengthened, it is difficult to support the vehicle body 3 while smoothly transmitting a rotational force to the sprocket 12. This is extremely disadvantageous for the working vehicle 2 of a heavy weight as the vehicle cited as an example. If the wheel hub 31 is to be highly strengthened, the wheel hub 31 inevitably has a larger size. Accordingly, it is difficult to reduce the vehicle height. Second, the wheel hub 31 is located nearer to the vehicle body 3 than to the sprocket 12. Therefore in the vehicle 2 of a large size in which the wheel hub 31 contains the reduction gear such as the planetary gear train or the like, the configuration in the small space between the sprockets 12 and 12 is complicated. Consequently, the vehicle height is difficult to be reduced, the distance between the sprockets 12 and 12 is difficult to be reduced (specifically, the vehicle width is difficult to be reduced), and the maintainability of the wheel hub 31 is worsened.

However, in the aforesaid example of the mechanism of the invention, the wheel hub 31 is supported with the bearings 32a and 32b. In this example, both sides are supported, therefore the inner bearing 32b is made smaller, and the outer bearing 32a is made larger. Accordingly, the planetary gear train is located at an outer position compared to the sprocket 12, and is contained in the wheel hub 31. Specifically, the configuration of the portion between the sprockets 12 and 12 is simplified, the vehicle height can be reduced, the distance between the sprockets 12 and 12 can be shortened, the vehicle width can be made smaller, and the maintainability of the wheel hub 31 can be improved.

The effect will be more understandable if it is seen in a horizontal shaft type of vehicle 2, which is used as a bulldozer or the like, shown in FIG. 34. Specifically, the vehicle 2 has a bevel and pinion 343b having right and left clutch and brake 343a for transmitting or cutting off high torque instead of the aforesaid differential 343. In this case, in order to transmit or cut off high torque, the clutch and brake 343a and the planetary gear train in the wheel hub 31 have a larger size. However, if it is constructed in such a way as to support the wheel hub 31 with the bearings 32a and 32a as shown in FIG. 34, sufficient space is secured for the clutch and brake 343a and for the bevel and pinion 343b requiring space for transmitting or cutting off high torque. Specifically, the configuration of the portion between the sprockets 12 and 12 becomes simple, the vehicle height is lowered, the vehicle width is reduced, and the maintainability of the wheel hub 31 is improved.

As shown in FIGS. 31 and 32, the aforesaid example of the mechanism has two brake mechanisms. A first brake mechanism 71 is composed of a brake disc 71a, provided at the outer perimeter of the wheel hub 31, a brake pad portion 71b, which is fixedly provided at the axle beam 34 and catches the aforesaid brake disc 71a therein, and a hydraulic or pneumatic cylinder (not illustrated) which operates the brake pad portion 71b and makes it catch the brake disc 71a therein. A second brake mechanism 72 is composed of a brake disc 72a, provided at the outer surface of the truck frame 15, a brake pad portion 72b, which is fixedly provided at the axle beam 34 and catches the brake disc 72a therein, and a hydraulic or pneumatic cylinder (not illustrated) which makes the brake pad portion 72b catch the brake disc 344 therein.

The operational effects of the first and second brake mechanisms 71 and 72 will be explained. While the vehicle 2 is traveling, both of the brake mechanisms 71 and 72 are released. Accordingly, the vehicle 2 can smoothly travel without stumbling. Braking is performed by applying the first brake mechanism 71 during traveling. Meanwhile, when an operation is carried out by using the working machine 5 as in the example, the vehicle 2 is stopped, and in this situation, both of the brake mechanisms 71 and 72 are applied, or the second brake mechanism 72 is applied. Thereby, the crawler device 1 maintains an angle of swing when the vehicle stopping irrespective of any variations in load and the road conditions. Thus a standing firm operation can be carried out. Specifically, stability in working can be secured. In other words, the second brake mechanism 72 serves as the aforesaid swing stopping mechanism. Though the first and the second braking devices 71 and 72 are of a brake pad type, they can be a band type, disc and clutch type, or the like. It should be noted that a brake pad type can be constructed to be more compact than a band type, a disc and clutch type, or the like.

The aforesaid example of the mechanism is used for the rear end crawler device 1B, coupled to the driving device as shown in FIGS. 31, 32, and 34, but as shown in FIG. 35, the pin coupling 331 of the knuckle arm 33 to the vehicle body 3 can be performed; then the knuckle arm 33 and the extendedly provided member 341 can be integrated, and a tie rod 331 can be connected to the knuckle arm 33. Specifically, the crawler device 1 can be steered by moving the tie rod 331 in right and left directions in FIG. 35. In this situation, as for the sprocket 12, the propeller shaft 341 contained in the axle beam 34 rotationally drives the sun gear 311 by way of a universal joint 345. Specifically, the aforesaid example of the mechanism can be used for the front end crawler device 1A coupled to the steering device and the driving device.

In the first and second embodiments, the front end idler 16A, the rear end idler 16B, and the rollers 14A and 14B are placed with the relationship $\{[(0.5\pm0.2)+N]Lp\}$ being respectively established for a first space Lpa between the front end idler 16A and the roller 14A closest thereto, a final space LPb between the final roller 14B and the rear end idler 16B, and the entire space LPn between the front end idler 16A and the end side entire space LPn between the front side idler 16A and the rear side idler 16B. Here, N is zero or a natural number, and Lp is a crawler pitch (hereinafter referred to as a predetermined pitch Lp). According to the above, an effect, which reduces the swing and vertical vibrations of the vehicle 2, is obtained. The details will be explained below with reference to FIG. 36 to FIG. 40.

Figure 37:
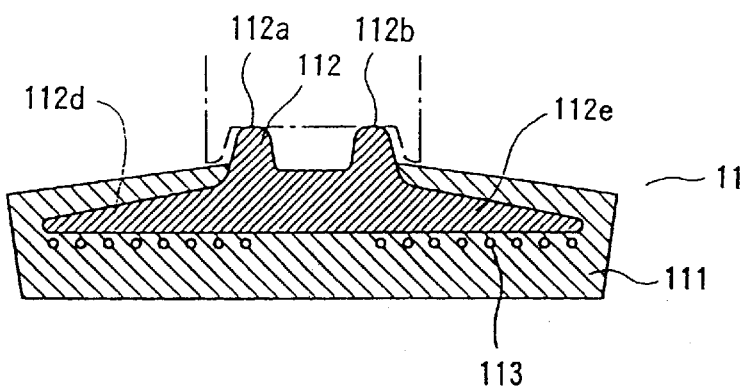
FIG. 37 is a sectional view taken along the R—R line in FIG. 36.
Figure 38:
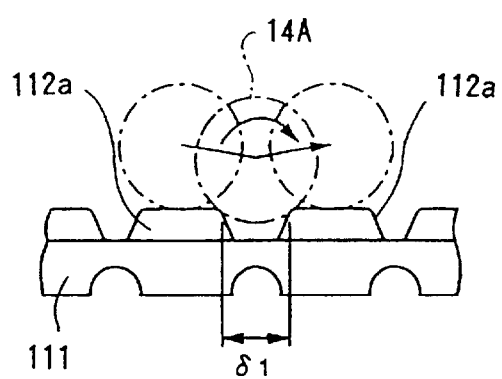
FIG. 38 is a side elevational view of the crawler belt in FIG. 36.

The crawler belt 11 is made of rubber, and is composed of a rubber belt 111, core metals 112, and core wires 113 as shown in FIG. 37. The core metals 112 are laid in the rubber belt 111 transverse to a longitudinal direction of the belt 111 at equal intervals in order. Each core metal 112 is provided with tread surfaces 112a and 112b in a protrusion form, which face each other at the center portion in a width direction of the rubber belt 111 with a space between them, and which are coupled with a pin portion 112c. A pair of blade portions 112d and 112c are integrally formed outside the tread surfaces 112a and 112b in a width direction thereof The tread surfaces 112a and 112b are protruded to the inner circumferential surface side of the rubber belt 111 so as to be rolling surfaces of the front end idler 16A, the rear end roller 16B, the roller 14A, and the roller 14B. A length La of the tread surface 112a has the same length as a length Lb of the tread surface 112b. At the center portion in a circumferential direction of the rubber belt 111, a hole 114 is provided between the pin portions 112c adjacent to each other. The tread surfaces 112a, and the tread surfaces 112b are respectively spaced with a gap δ1 between them in a longitudinal direction of the rubber belt 111 as shown in FIG. 38. A plurality of core wires 113 are laid inside the rubber belt 111 at the outer perimeter side of the core metals 112 as reinforcements of the rubber belt 111.

Specifically, while the vehicle 2 is traveling, the rollers 14A and 14B, and the front and rear idlers 16A and 16B are rolling on the tread surfaces 112a and 112b. At this time, as shown, for example, in FIG. 38, the roller 14A slips downwardly when it is positioned at the gap δ1. Thus, the truck frame 15 swings unnecessarily, and vibrates vertically to be a source of vibrations during traveling.

However, when the front and the rear idlers 16A and 16B, and the rollers 14A and 14B are laced as described above, even if any one of the front and the rear idlers 16A and 16B, and the rollers 14A and 14B is positioned at the gap δ1, the other ones are surely on the treads surfaces 112a and 112b. Accordingly, the swing and vertical vibrations of the vehicle 2 are reduced by the degree described above. The detailed explanation is as follows.

Figure 39:
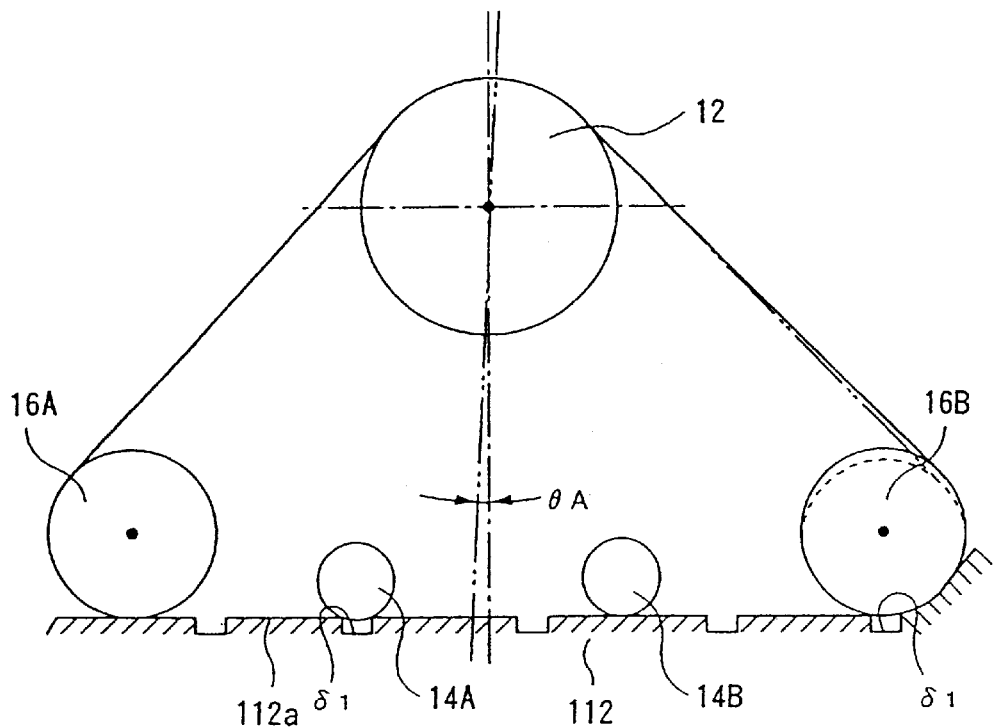
FIG. 39 is a schematic explanatory view of the placement of a sprocket, idlers, and two rollers according to the embodiments of the present invention.

For example, as shown in FIG. 39, even when the front end idler 16A rides on the tread surfaces 112a and 112b and the rear end idler 16B is positioned at the gap δ1, the final roller 14B rides on the tread surfaces 112a and 112b. Accordingly, an angle of swing θA, which is generated as a result of the rear end idler 16B falling into the gap δ1, is decreased. In FIG. 39, the sprocket 12, receiving the weight of the vehicle 2, is placed at the almost center of the portion between the front end idler 16A and the rear end idler 16B. Specifically, a vertical line, which passes through the sprocket 12, receiving the dead weight of the vehicle 2, passes the left side of the final roller 14B in FIG. 39 (opposite side to the rear end idler 16B). Accordingly, even when the rear end idler 16B is positioned at the gap δ1, the rear end idler 16B can be prevented from falling into the gap δ1. Specifically, vertical movement of the sprocket 12 (specifically, of the vehicle 2) is reduced.

Figure 40:
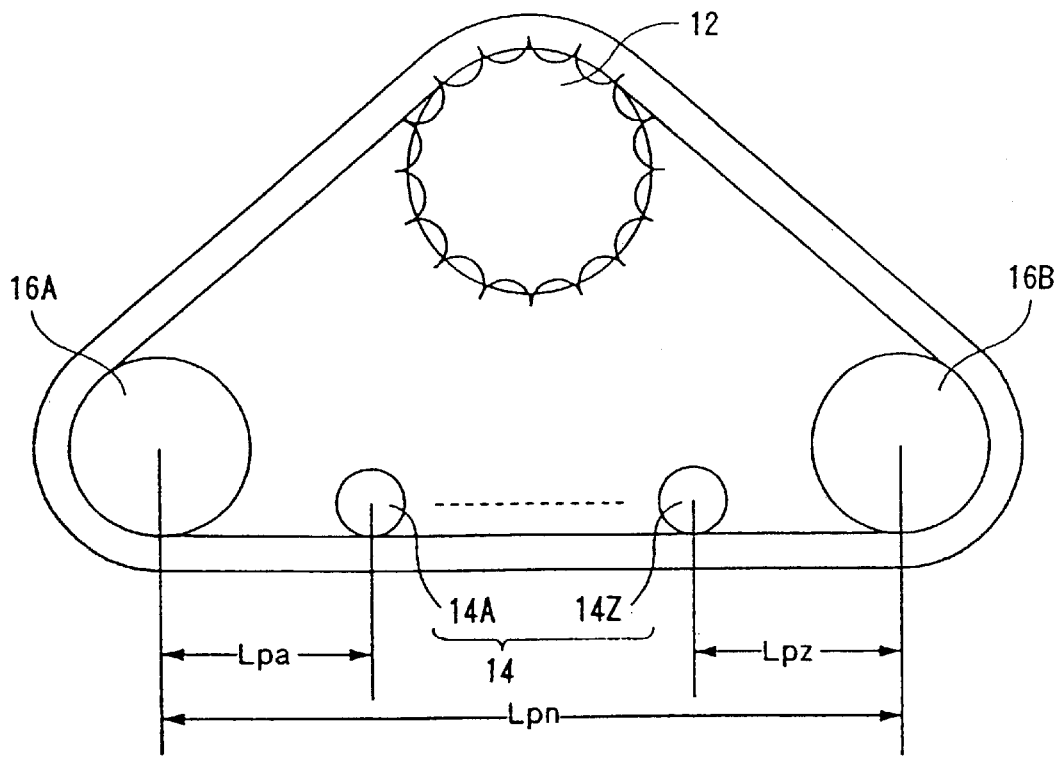
FIG. 40 is a schematic explanatory view when a number of rollers are used in FIG. 39.

Though the explanation is made with the aforesaid crawler belt 11 being a crawler belt made of rubber, the same effect as described above is obtained even with a crawler belt made of metal, if in the crawler belt 11, the tread surfaces 112a and 112b for the front and the rear idlers 16A and 16B, and the rollers 14A and 14B are placed at a predetermined pitch with the gap δ1 between them. In the aforesaid explanation, the number of the rollers 14A and 14B is two, but as shown in FIG. 40, with the roller 14 having three or more rollers 14A, . . . , 14Z, the same effect as described above can be obtained if the placement is the same as described above. When the aforesaid placement is applied to the third embodiment, it is suitable if the rear end idler 16B is replaced for the sprocket 12, and in this case, the same effect as described above can be also obtained.

Figure 41:
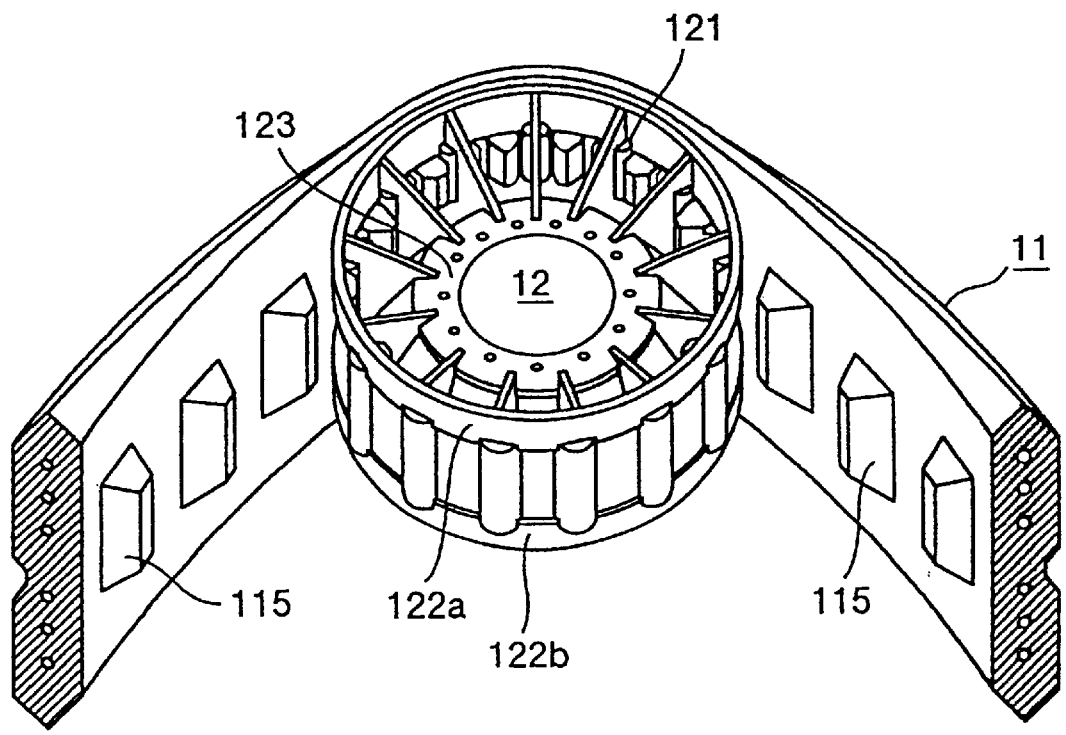
FIG. 41 is a perspective view of the crawler belt passed around the sprocket according to the embodiments of the present invention.
Figure 42:
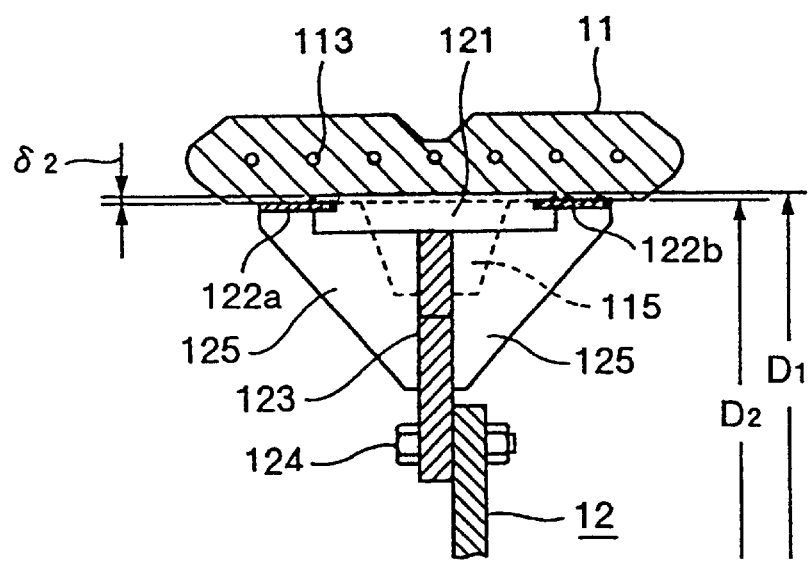
FIG. 42 is a sectional view of an engaging portion of the crawler belt and the sprocket in FIG. 41.

Next, examples of the sprocket 12 and the crawler belt 11, preferable for the first to the third embodiments, will be described with reference to FIGS. 41–44. As shown in FIGS. 41 and 42, the crawler belt is made of rubber, and has raised portions 115 in the center portion of the inner surface at predetermined pitches in order in the direction in which the crawler belt 11 is passed around. Meanwhile, the sprocket 12 has a plurality of engaging gears 121 with the aforesaid raised portions 115 on the outer perimeter thereof. The sprocket 12 has an external diameter D2 which is smaller than an external diameter D1 of the tops of the engaging gears 121 (D1>D2, (D1−D2)/2=δ2), and is fixedly provided with cylinder members 122a and 122b, which can be abutted to the surface surrounding the aforesaid raised portions 115 on the outer perimeter surface thereof, on the right and left sides of the engaging gears 121. Specifically, a doughnut-shaped disc 123 is clamped with a bolt 124 on the outer perimeter of the sprocket 12, and round bars (hereinafter, referred to as round bars 121), which are engaging gears 121, are fixedly provided at the outer perimeter of the disc 123 at predetermined pitches. The round bars 121 are fixedly provided at the outer perimeter of the disc 123 by means of right and left ribs 125 with the longitudinal direction thereof being in a lateral direction of the vehicle 2. The cylinder members 122a and 122b are also fixed at the disc 123 by the ribs 125. The crawler belt 11 and the sprocket 12 with the aforesaid configuration have the following operational effects.

Figure 43:
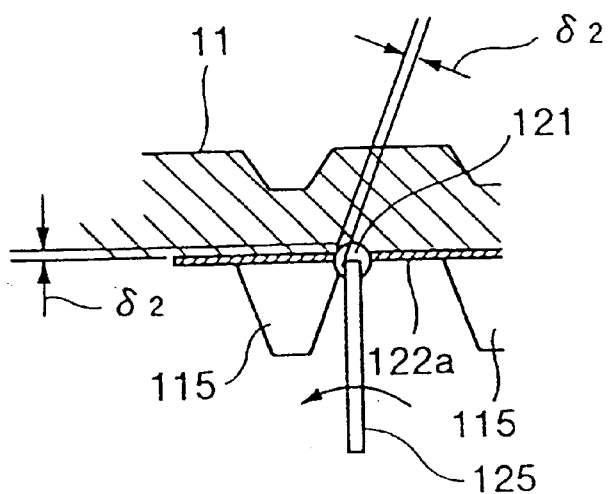
FIG. 43 is a side elevational view of an engaging portion of the crawler belt and the sprocket in FIG. 41.
Figure 44:
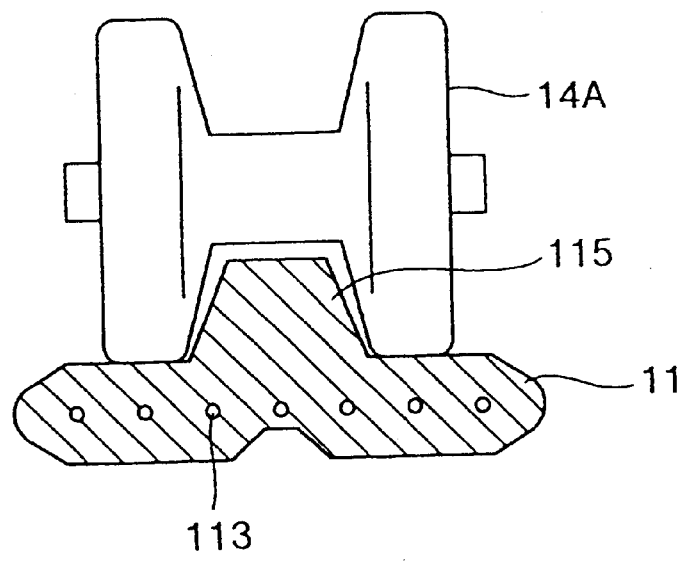
FIG. 44 is an explanatory view of a roller rolling on the crawler belt in FIG. 41.
Figure 45:
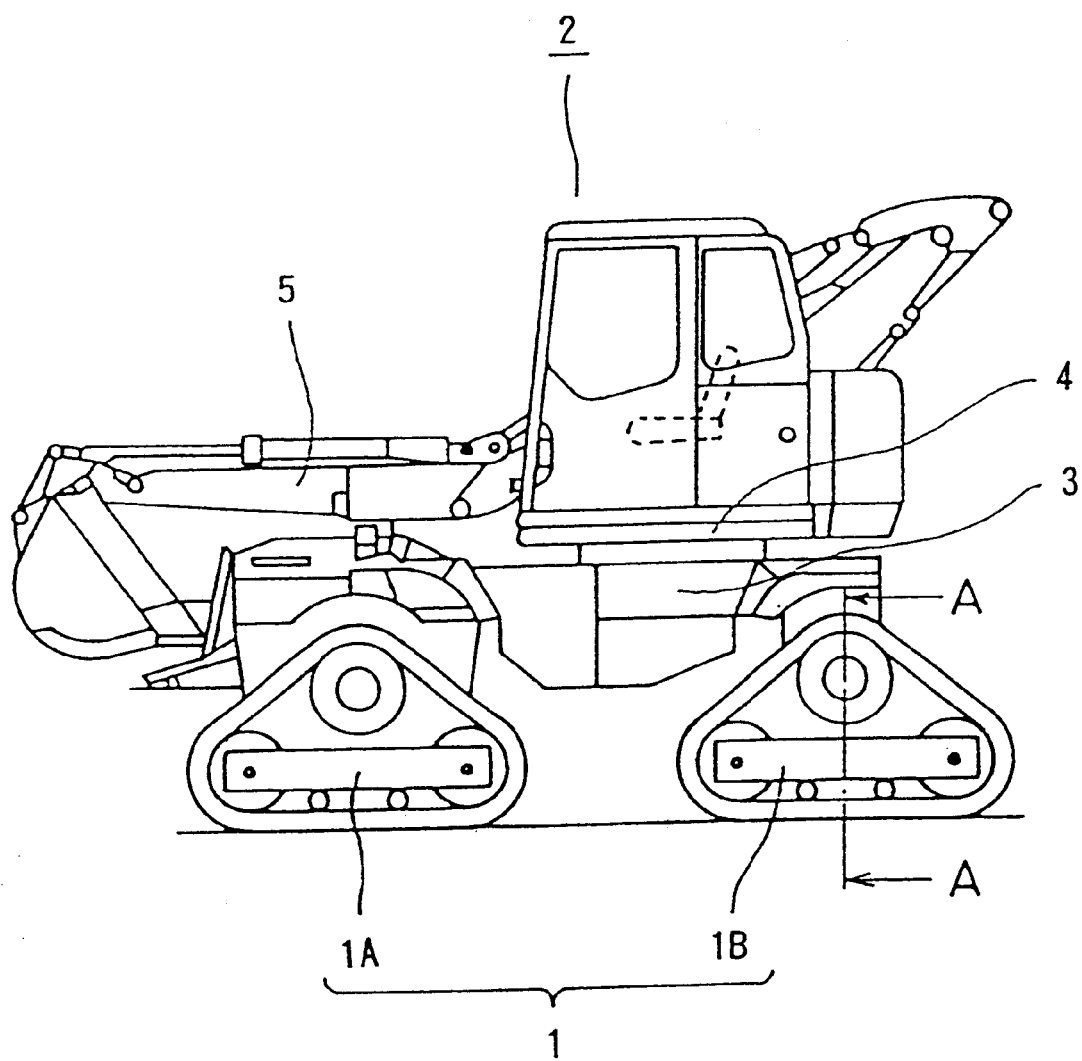
FIG. 45 is a side elevational view of a working vehicle equipped with a conventional crawler device in a triangular form.

As shown in FIGS. 42 and 43, when the crawler belt 11 is engaged with a round bar 121, the round bar 121 engages the bottom and side surfaces of the raised portion 115 of the crawler belt 11 by δ2. At the same time, the outer perimeter surfaces of the cylinder members 122a and 122b are brought into forceful contact with the surface surrounding the raised portion 115 of the crawler belt 11. Accordingly, the crawler belt 11 obtains a rotational driving force from the sprocket 12. Here, the crawler belt 11 does not need the core metals 112 in the crawler belt 11 made of rubber, which is described in the explanation of the aforesaid embodiments, thereby reducing the weight. Accordingly, the sprocket 12 can transmit a highly efficient rotational force to the crawler belt 11. Specifically, a higher tractive force is obtained, the separation of the crawler 11 is difficult to occur by the amount of engagement δ, slip is difficult to occur, and the weight, the noise, and the cost can be reduced. As is obvious from FIG. 44 showing contact relationship between, for example, the roller 14A and the crawler belt 11, the raised portion 115 is housed in a center recessed portion of the rollers 14A and 14B, and the front and rear idlers 16A and 16B; therefore, the disadvantage of the separation of the crawler belt 11 can be also eliminated, as seen from this aspect.

The sprocket 12 in the aforesaid first, second, and third embodiments has a configuration all of the driving force is obtained from the vehicle 2, but, needless to say, a type in which the wheel hub 31 contains, for example, a hydraulic motor or the like can be suitable.

INDUSTRIAL AVAILABILITY

The present invention is useful as a crawler device for a crawler type of vehicle which lowers the vehicle height, decreases the vehicle width, has excellent maintainability, does not stumble at an obstacle even when colliding with the obstacle during traveling, and which exhibits excellent operation stability in a working vehicle with simple structure.

What is claimed is:
1. A crawler device suitable for use on a crawler vehicle having a pair of crawler devices on at least one of a front portion of said vehicle and a rear portion of said vehicle, said crawler device comprising:
    a truck frame;
    a sprocket, being a driving wheel;
    at least one idler, being a driven wheel and being disposed on said truck frame;
    a crawler belt passed around said sprocket and said at least one idler as an endless loop;

a front end link coupled to a forward portion of said truck frame by a pin located at a lower end portion of said front end link; said front end link being adapted to be coupled to a body side of the vehicle by a pin located at an upper end portion of said front end link; and a rear end link coupled to a rearward portion of said truck frame by a pin located at a lower end portion of said rear end link, said rear end link being adapted to be coupled to said body side at a position behind said front end link by a pin located at an upper end portion of said rear end link, wherein a quadric link structure, which is formed by said body side, said truck frame, said front end link, and said rear end link, has a length on said truck frame which is shorter than its length on said body side.

2. A crawler device in accordance with claim 1, wherein a point of intersection (P) of an axis of said front end link and an axis of said rear end link is located inside said endless loop.

3. A crawler device in accordance with claim 1, wherein at least one of a swing stopping mechanism for stopping a swing of said truck frame at any position and a swing control mechanism for controlling a maximum swing of said truck frame, is provided between said body side and said truck frame.

4. A crawler device in accordance with claim 1, wherein said truck frame is disposed below said sprocket wheel, and wherein said at least one idler comprises a front end idler, disposed at a front portion of said truck frame, and a rear end idler, disposed at a rear portion of said truck frame.

5. A crawler device in accordance with claim 4, wherein a point of intersection (P) of an axis of said front end link and an axis of said rear end link is located inside said endless loop.

6. A crawler device in accordance with claim 4, further comprising:

at least one roller positioned at a lower portion of said truck frame between said front end idler and said rear end idler;

wherein said crawler belt has tread surfaces, in a protrusion form at a predetermined pitch spaced with a predetermined gap, to be trod by said front end idler, said rear end idler, and said at least one roller; and wherein a distance between said front end idler and a roller adjacent to said front end idler, a distance between said rear end idler and a roller adjacent to said rear end idler, and a distance between said front end idler and said rear end idler are each expressed by $$[(0.5\pm0.2)+N]\times Lp$$

where N is set as zero or a natural number, and Lp is set as a crawler belt pitch.

7. A crawler device in accordance with claim 4, wherein at least one of a swing stopping mechanism for stopping a swing of said truck frame at any position and a swing control mechanism for controlling a maximum swing of said truck frame, is provided between said body side and said truck frame.

8. A crawler vehicle having a pair of crawler devices on at least one of a front portion of said vehicle and a rear portion of said vehicle, each said crawler device comprising:

a truck frame;

a sprocket, being a driving wheel;

at least one idler, being a driven wheel and being disposed said truck frame;

a crawler belt passed around said sprocket and said at least one idler as an endless loop;

a front end link being coupled to a forward portion of said truck frame by a pin located at a lower end portion of said front end link; said front end link being coupled to a body side of the vehicle by a pin located at an upper end portion of said front end link; and a rear end link being coupled to a rearward portion of said truck frame by a pin located at a lower end portion of said rear end link; said rear end link being coupled to said body side at a position behind said front end link by a pin located at an upper end portion of said rear end link, wherein in each crawler device a quadric link structure, which is formed by said body side, said truck frame, said front end link, and said rear end link, has a length on said truck frame which is shorter than its length on said body side.

9. A crawler vehicle in accordance with claim 8, wherein in each crawler device a point of intersection (P) of an axis of said front end link and an axis of said rear end link is located inside said endless loop.

10. A crawler vehicle in accordance with claim 8, wherein each crawler device further comprises:

at least one roller positioned at a lower portion of said truck frame between said front end idler and said rear end idler;

wherein said crawler belt has tread surfaces, in a protrusion form at a predetermined pitch spaced with a predetermined gap, to be trod by said front end idler, said rear end idler, and said at least one roller; and wherein a distance between said front end idler and a roller adjacent to said front end idler, a distance between said rear end idler and a roller adjacent to said rear end idler, and a distance between said front end idler and said rear end idler are each expressed by $$[(0.5\pm0.2)+N]\times Lp$$

where N is set as zero or a natural number, and Lp is set as a crawler belt pitch.

11. A crawler vehicle in accordance with claim 8, wherein in each crawler device at least one of a swing stopping mechanism for stopping a swing of said truck frame at any position and a swing control mechanism for controlling a maximum swing of said truck frame, is provided between said body side and said truck frame.

12. A crawler vehicle in accordance with claim 8, wherein in each crawler device said truck frame is disposed below said sprocket wheel, and wherein said at least one idler comprises a front end idler, disposed at a front portion of said truck frame, and a rear end idler, disposed at a rear portion of said truck frame.

13. A crawler vehicle in accordance with claim 12, wherein in each crawler device a point of intersection (P) of an axis of said front end link and an axis of said rear end link is located inside said endless loop.

14. A crawler vehicle in accordance with claim 12, wherein each crawler device further comprises:

at least one roller positioned at a lower portion of said truck frame between said front end idler and said rear end idler;

wherein said crawler belt has tread surfaces, in a protrusion form at a predetermined pitch spaced with a predetermined gap, to be trod by said front end idler, said rear end idler, and said at least one roller; and wherein a distance between said front end idler and a roller adjacent to said front end idler, a distance between said rear end idler and a roller adjacent to said rear end idler, and a distance between said front end idler and said rear end idler are each expressed by $$[(0.5\pm0.2)+N]\times Lp$$

where N is set as zero or a natural number, and Lp is set as a crawler belt pitch.

15. A crawler vehicle in accordance with claim 12, wherein each crawler device further comprises at least one of a swing stopping mechanism for stopping a swing of said truck frame at any position and a swing control mechanism for controlling a maximum swing of said truck frame, provided between said body side and said truck frame.

* * * * *